United States Patent
Kim et al.

(10) Patent No.: US 9,554,370 B2
(45) Date of Patent: Jan. 24, 2017

(54) METHOD AND APPARATUS FOR TRANSMITTING CONTROL INFORMATION THROUGH UPLINK

(71) Applicant: LG ELECTRONICS INC., Seoul (KR)

(72) Inventors: Bong Hoe Kim, Anyang-si (KR); Dong Youn Seo, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 14/372,182

(22) PCT Filed: Jan. 15, 2013

(86) PCT No.: PCT/KR2013/000295
§ 371 (c)(1),
(2) Date: Jul. 14, 2014

(87) PCT Pub. No.: WO2013/105836
PCT Pub. Date: Jul. 18, 2013

(65) Prior Publication Data
US 2015/0110016 A1    Apr. 23, 2015

Related U.S. Application Data

(60) Provisional application No. 61/586,828, filed on Jan. 15, 2012.

(51) Int. Cl.
*H04W 72/04* (2009.01)
*H04L 5/00* (2006.01)
(Continued)

(52) U.S. Cl.
CPC ........ *H04W 72/0413* (2013.01); *H04L 1/0073* (2013.01); *H04L 5/001* (2013.01);
(Continued)

(58) Field of Classification Search
CPC ............. H04L 5/0046; H04L 2001/125; H04L 5/0057; H04L 5/0055; H04L 1/0073; H04L 5/001; H04W 72/0413
See application file for complete search history.

(56) References Cited

U.S. PATENT DOCUMENTS

2010/0271970 A1   10/2010  Pan et al.
2011/0249578 A1   10/2011  Nayeb Nazar et al.

FOREIGN PATENT DOCUMENTS

CN   101395879 A   3/2009
CN   102282819 A   12/2011
(Continued)

OTHER PUBLICATIONS

"Technical Specification Group Radio Access Network; Evolved Universal Terrestrial Radio Access (E-UTRA); Physical Channels and Modulation (Release 8)", 3GPP TS 36.211 V.8.5.0, Dec. 2008.

*Primary Examiner* — Gbemileke J Onamuti
(74) *Attorney, Agent, or Firm* — Dentons US LLP

(57) ABSTRACT

A technique according to the present specification relates to a method and apparatus for transmitting control information, which support carrier aggregation, through an uplink. Particularly, bits to be transmitted through a physical uplink control channel (PUCCH) are acquired, and at least one channel state information (CSI) bit indicating a wireless channel state and a plurality of ACK/NACK bits related to a plurality of carriers are acquired and transmitted. In addition, the plurality of ACK/NACK bits and the CSI bit are encoded using different Reed-Muller coding blocks (a first Reed-Muller coding block and a second Reed-Muller coding block).

7 Claims, 18 Drawing Sheets

(51) Int. Cl.
*H04L 1/00* (2006.01)
*H04L 1/12* (2006.01)
(52) U.S. Cl.
CPC .......... *H04L 5/0055* (2013.01); *H04L 5/0057*
(2013.01); *H04L 5/0046* (2013.01); *H04L 2001/125* (2013.01)

(56) References Cited

FOREIGN PATENT DOCUMENTS

| KR | 10-2010-0126857 A | 12/2010 |
| KR | 10-2011-0124726 A | 11/2011 |
| WO | 2010/127292 A2 | 11/2010 |
| WO | 2011-158968 A1 | 12/2011 |

FIG. 17

| A₀ | A₁ | B₈ | B₉ | A₂ | A₃ | B₁₀ | B₁₁ | B₀ | B₁ | B₁₂ | B₁₃ | B₂ | B₃ | B₁₄ | B₁₅ | B₄ | B₅ | B₁₆ | B₁₇ | B₆ | B₇ | B₁₈ | B₁₉ | A₄ | A₅ | B₂₈ | B₂₉ | A₆ | A₇ | B₃₀ | B₃₁ | B₂₀ | B₂₁ | B₃₂ | B₃₃ | B₂₂ | B₂₃ | B₃₄ | B₃₅ | B₂₄ | B₂₅ | B₃₆ | B₃₇ | B₂₆ | B₂₇ | B₃₈ | B₃₉ |

METHOD AND APPARATUS FOR TRANSMITTING CONTROL INFORMATION THROUGH UPLINK

This application is a 35 USC §371 National Stage entry of International Application No. PCT/KR2013/000295, filed Jan. 15, 2013, and claims priority to U.S. Provisional Application No. 61/586,828 filed Jan. 15, 2012, each of which are hereby incorporated by reference in its entirety.

BACKGROUND OF THE INVENTION

Field of the Invention

The present invention relates to wireless communication, and more particularly, to a method and apparatus for transmitting control information in a wireless communication system which supports carrier aggregation (CA).

Related Art

One of requirements of a wireless communication system is to support a high data transmission ratio. To this end, various technologies such as multiple input multiple output, MIMO), cooperative multiple point transmission (CoMP), a relay, and carrier aggregation have been researched.

The carrier aggregation is a concept of aggregating a plurality of bands to one system. In this case, each independently operable band may be called a component carrier (CC).

Meanwhile, user equipment may transmit various control information through an uplink. An example of the control information includes ACK/NACK information or channel state information (CSI) for HARQ operation. The user equipment may include a plurality of channel state information (CSI) feed-backing a base station, and one channel state information may be generated and analyzed based on another channel state information.

SUMMARY OF THE INVENTION

An object of the present invention is to provide a method and apparatus for effectively transmitting control information in a wireless communication system which supports carrier aggregation.

The present invention provides a method and apparatus of transmitting control information through the uplink in a wireless communication system which supports a plurality of carriers related to carrier aggregation.

In detail, the control information is transmitted by configured bits to be transmitted through a physical uplink control channel (PUCCH) by means of acquiring at least one channel state information (CSI) bit representing a radio channel state and a plurality of ACK/NACK bits related to the plurality of carrier.

Additionally or alternatively, the plurality of ACK/NACK bits and the CSI bit are encoded by using separate reed-muller coding blocks (a first reed-muller coding block and a second reed-muller coding block).

Additionally or alternatively, a first bit sequence is generated by performing rate matching in which the 32-bit sequence encoded by the first reed-muller coding block is truncated or circular-repeated.

Additionally or alternatively, a second bit sequence is generated by performing rate matching in which the 32-bit sequence encoded by the second reed-muller coding block is truncated or circular-repeated.

Additionally or alternatively, interleaving is performed for the first bit sequence and the second bit sequence.

Additionally or alternatively, modulation is performed with the interleaved bit sequence.

In this case, the first reed-muller coding block and the second reed-muller coding block perform the encoding on the basis of the same basis sequences.

Additionally or alternatively, each of the first reed-muller coding block and the second reed-muller coding block encodes the input bit sequence to a 32-bit sequence.

Additionally or alternatively, the first bit sequence is generated by truncating or circular-repeating the encoded bits by the first reed-muller coding block, and the second bit sequence is generated by truncating or circular-repeating the encoded bits by the second reed-muller coding block.

Additionally or alternatively, the entire length of the first bit sequence and the second bit sequence is determined as 48 bits, and the entire length of the interleaved bit sequence is determined as 48 bits.

Additionally or alternatively, the first 24 bits of the interleaved bit sequence are transmitted through a first slot of a subframe, and the last 24 bits of the interleaved bit sequence are transmitted through a second slot of the subframe.

Additionally or alternatively, the interleaved bit sequence is modulated to a plurality of Quadrature Phase Shift Keying (QPSK) symbols.

In the case of simultaneously transmitting information regarding ACK/NACK and information regarding CSI (for example, in the case of transmitting the information through a PUCCH format 3), since the information regarding ACK/NACK and the information regarding CSI are independently RM-encoded and independently rate-matched, independent performance requirements may be easily suitable.

BRIEF DESCRIPTION OF THE DRAWINGS

FIG. 17 shows a final result according to the fourth interleaving technique.

DESCRIPTION OF EXEMPLARY EMBODIMENTS

The present invention provides a method and apparatus for transmitting control information in a wireless communication system, which supports carrier aggregation (CA) in the wireless communication system. For clarifying the description, the present invention will be described based on 3GPP LTE supporting the carrier aggregation (CA) and an evolution thereof, but is not limited thereto.

Long term evolution (LTE) for a 3rd generation partnership project (3GPP) standard organization, as a part of evolved-UMTS (E-UMTS) using an evolved-universal terrestrial radio access network (E-UTRAN), adopts orthogonal frequency division multiple access (OFDMA) in a downlink, and adopts single carrier-frequency division multiple access (SC-FDMA) in a uplink. LTE-A (advanced) is an evolution of the LTE.

Figure 1:
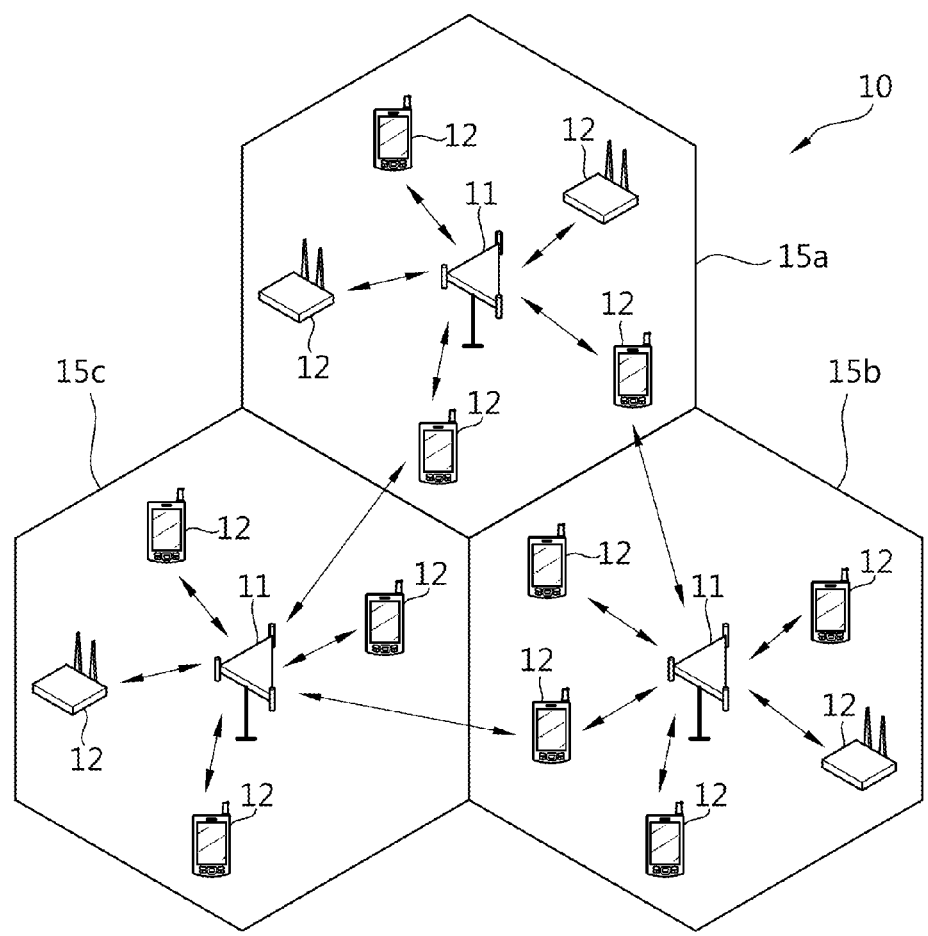
FIG. 1 shows a wireless communication system.

FIG. 1 shows a wireless communication system.

Referring to FIG. 1, the wireless communication system 10 includes one or more Base Stations (BSs) 11. The BSs 11 provide communication services to specific geographical areas 15 commonly called cells. Each of the cells may be divided into a plurality of areas, and each of the areas is called a sector. One BS may include one or more cells. In general, the BS 11 refers to a fixed station that communicates with UEs 13, and it may also be called another terminology, such as an evolved NodeB (eNB), a Base Transceiver System (BTS), an access point, or an Access Network (AN).

The User Equipment (UE) 12 may be fixed or mobile and may also be called another terminology, such as a Mobile Station (MS), a User Terminal (UT), a Subscriber Station (SS), a wireless device, a Personal Digital Assistant (PDA), a wireless modem, a handheld device, or an Access Terminal (AT).

Hereinafter, downlink (DL) refers to communication from the BS 11 to the UE 12, and uplink (UL) refers to communication from the UE 12 to the BS 11.

The wireless communication system 10 may be a system which supports bidirectional communication. Bidirectional communication can be performed using Time Division Duplex (TDD) mode, Frequency Division Duplex (FDD) mode or the like. TDD mode uses different time resources in UL transmission and DL transmission. FDD mode uses different frequency resources in UL transmission and DL transmission. The BS 11 and the UE 12 communicate with each other using radio resources called radio frames.

Figure 2:
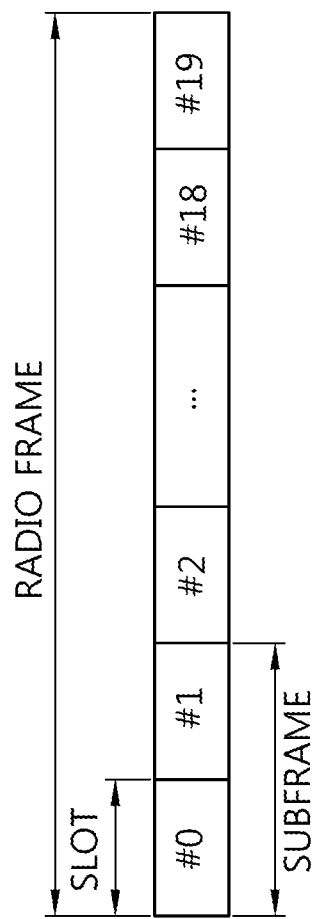
FIG. 2 shows a radio frame structure.

FIG. 2 shows the structure of a radio frame.

Referring to FIG. 2, the radio frame includes 10 subframes, and one subframe includes two slots. The length of one subframe may be 1 ms, and the length of one slot may be 0.5 ms. The time that it takes to transmit one subframe is called a Transmission Time Interval (TTI). The TTI may be a minimum scheduling unit.

One slot may include a plurality of Orthogonal Frequency Division Multiplexing (OFDM) symbols in the time domain. The OFDM symbol is used to represent one symbol period because 3GPP LTE uses OFDMA in downlink and may be called another terminology according to a multiple access scheme. For example, if SC-FDMA is used as an uplink multiple access scheme, corresponding symbols may be called SC-FDMA symbols. One slot is illustrated as including 7 OFDM symbols, but the number of OFDM symbols included in one slot may be changed depending on the length of a Cyclic Prefix (CP). In accordance with 3GPP TS 36.211 V8.5.0 (2008-12), 1 subframe includes 7 OFDM symbols in a normal CP, and 1 subframe includes 6 OFDM symbols in an extended CP. The structure of the radio frame is only an example, and the number of subframes included in the radio frame and the number of slots included in the subframe may be changed in various ways.

Figure 3:
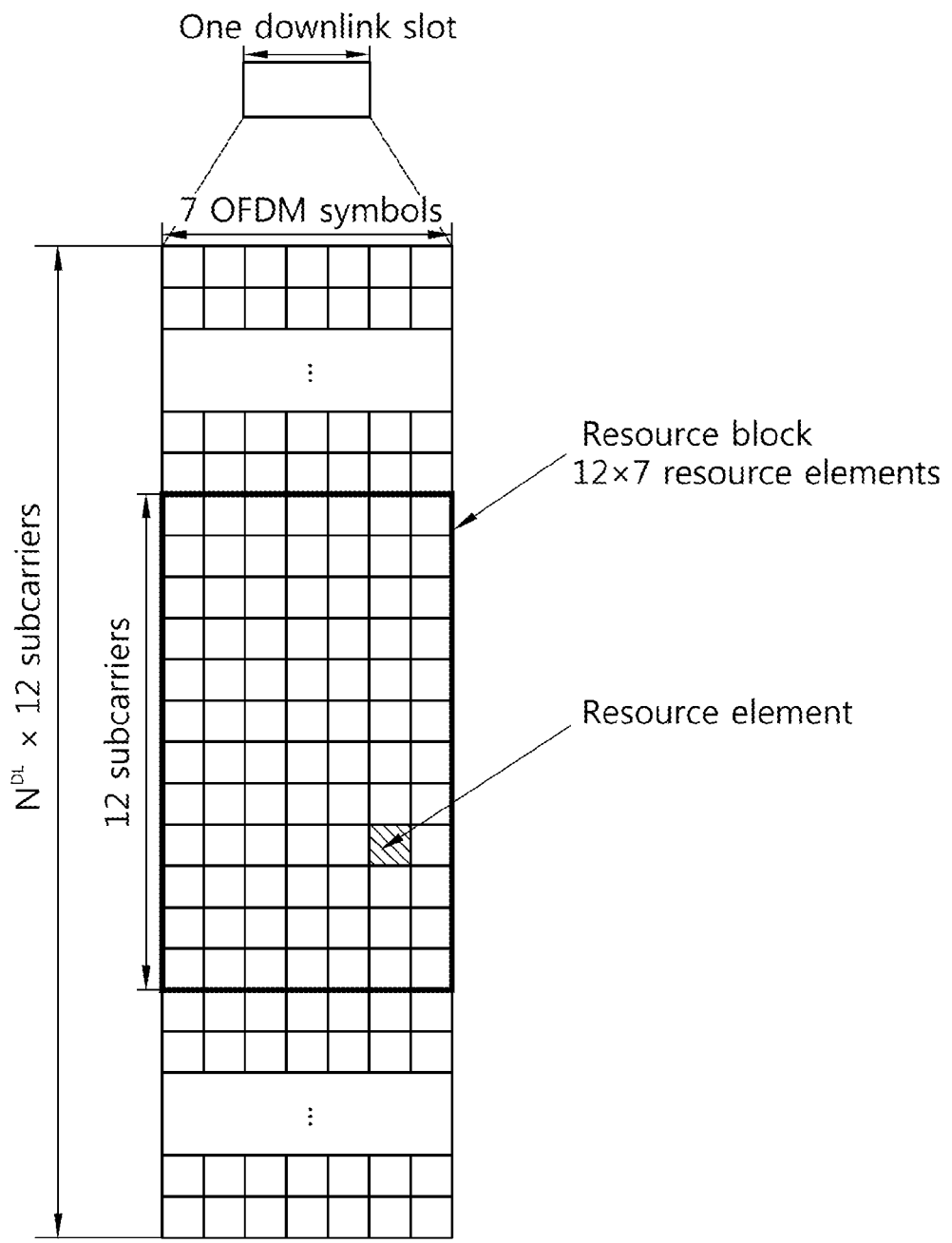
FIG. 3 shows an example of a resource grid for one downlink slot.

FIG. 3 shows an example of a resource grid for one downlink slot.

Referring to FIG. 3, the downlink slot includes a plurality of OFDM symbols in the time domain and includes $N_{RB}$ Resource Blocks (RBs) in the frequency domain. The resource block is a resource allocation unit, and it includes one slot in the time domain and includes a plurality of contiguous subcarriers in the frequency domain.

The number of resource blocks $N_{RB}$ included in a downlink slot depends on a downlink transmission bandwidth configured in a cell. For example, in an LTE system, the number of resource blocks $N_{RB}$ may be any one of 6 to 110. An uplink slot may have the same structure as the downlink slot.

Each of elements on the resource grid is called a Resource Element (RE). The resource elements on the resource grid may be identified by an index pair (k, l) within a slot. Here, k (k=0, . . . , $N_{RB}$×12−1) indicates a subcarrier index in the frequency domain, and l (l=0, . . . , 6) indicates an OFDM symbol index in the time domain.

In FIG. 3, one resource block is illustrated as including 7×12 resource elements, including 7 OFDM symbols in the time domain and 12 subcarriers in the frequency domain. However, the number of OFDM symbols and the number of subcarriers within a resource block are not limited thereto. The number of OFDM symbols and the number of subcarriers may be changed in various ways depending on the length of a CP, frequency spacing, etc. For example, the number of OFDM symbols is 7 in case of a normal CP, and the number of OFDM symbols is 6 in case of an extended CP. One of 128, 256, 512, 1024, 1536, and 2048 may be selected and used as the number of subcarriers in one OFDM symbol.

Figure 4:
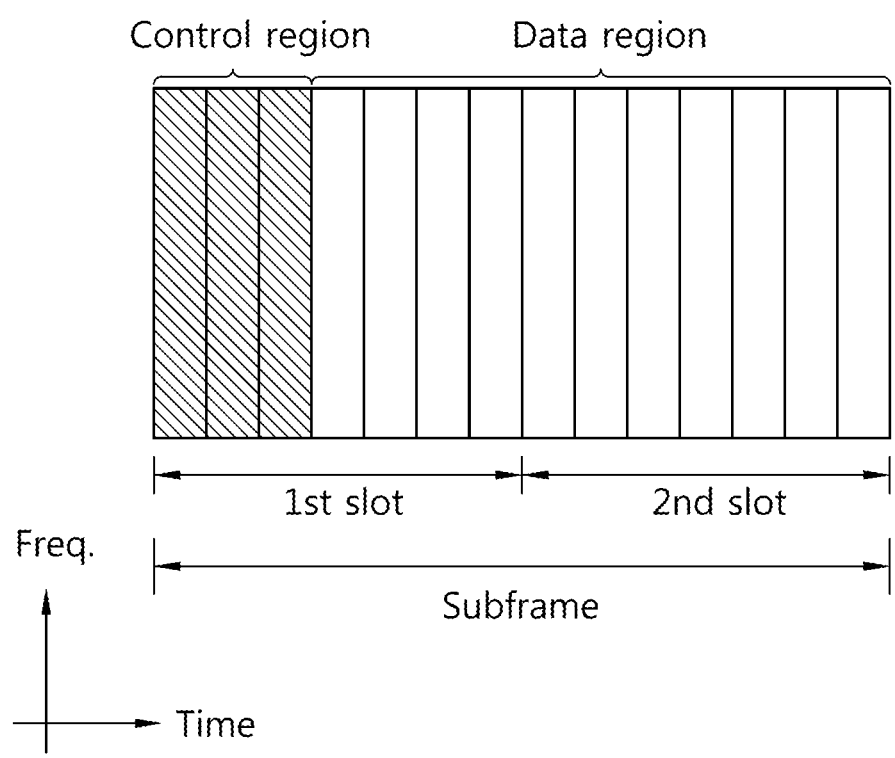
FIG. 4 shows an example of a downlink subframe structure in 3GPP LTE.

FIG. 4 shows an example of the structure of a downlink subframe in 3GPP LTE. The subframe includes two consecutive slots. A maximum of three former OFDM symbols of a first slot within the downlink subframe become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid ARQ indicator channel (PHICH), in addition to the PDCCH can be allocated to the control region. UE can read data information transmitted through the PDSCHs by decoding control information transmitted through the PDCCH. Here, the control region is illustrated as including the 3 OFDM symbols, but this is only illustrative. The PDCCH carries a downlink grant that informs the allocation of the resources of downlink transmission on the PDSCH. More particularly, the PDCCH can carry the allocation of the resources of the transport format of a downlink shared channel (DL-SCH), paging information on a paging channel (PCH), system information on a DL-SCH, the allocation of the resources of a higher layer control message, such as a random access response transmitted on a PDSCH, a transmission power control command, and the activation of a voice over IP (VoIP). Furthermore, the PDCCH carries an uplink grant that informs UE of the allocation of resources of uplink transmission. The number of OFDM symbols included in the control region within the subframe can be known by a PCFICH. The PHICH carries Hybrid Automatic Repeat reQuest (HARQ) acknowledgment (ACK)/negative-acknowledgement (NACK) signals in response to uplink transmission.

Figure 5:
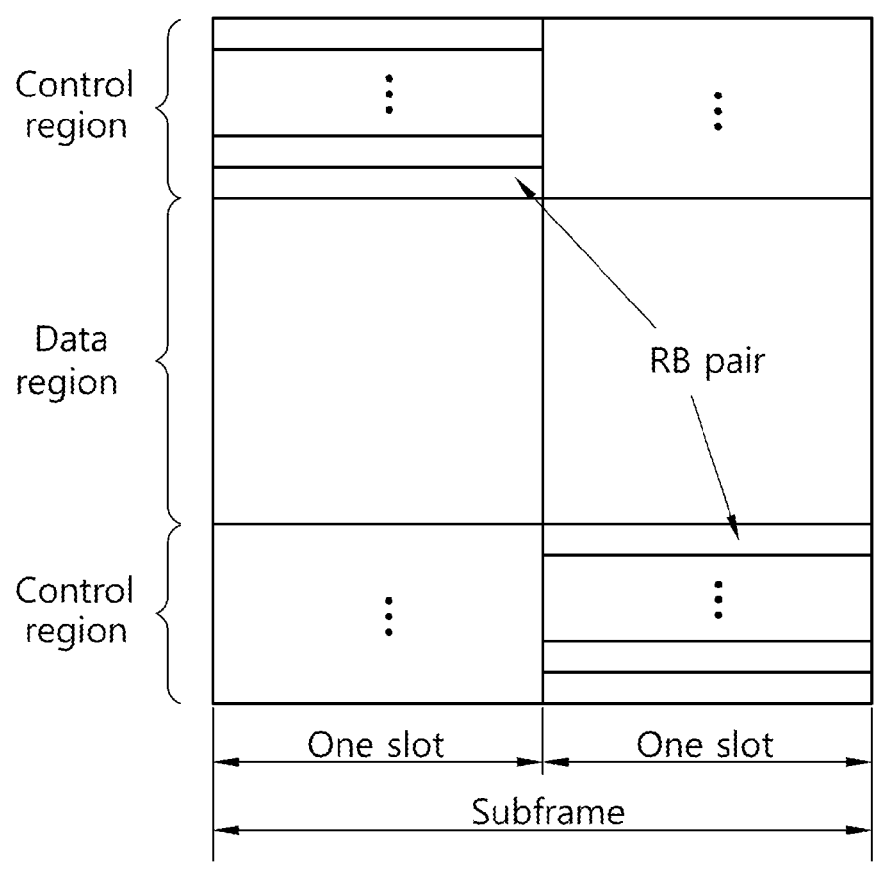
FIG. 5 shows a structure of an uplink subframe.

FIG. 5 shows the structure of an uplink subframe.

Referring to FIG. 5, the uplink subframe can be divided into a control region and a data region in the frequency domain. A physical uplink control channel (PUCCH) on which uplink control information is transmitted is allocated to the control region. A physical uplink shared channel (PUSCH) on which data (control information may also be transmitted according to circumstances) is transmitted is allocated to the data region. UE may transmit a PUCCH and a PUSCH at the same time or may transmit only one of a PUCCH and a PUSCH depending on a configuration.

A PUCCH for an MS is allocated in the form of a resource block pair (RB pair) in the subframe. Resource blocks that belong to the resource block pair occupy different subcarriers in a first slot and a second slot. A frequency that is occupied by the resource blocks belonging to the resource block pair to which a PUCCH is allocated is changed on the basis of a slot boundary. This is said that the RB pair allocated to the PUCCH has been subjected to frequency-hopped at the slot boundary. UE can obtain a frequency diversity gain by transmitting uplink control information through different subcarriers according to the time.

A Hybrid Automatic Repeat reQuest (HARQ) acknowledgement (ACK)/non-acknowledgement (NACK), and Channel Status Information (CSI) (e.g., a Channel Quality Indicator (CQI), a Precoding Matrix Index (PMI), a Precoding Type Indicator (PTI), and a Rank Indication (RI)) indicating a downlink channel state can be transmitted on the PUCCH.

The PUSCH is mapped to an UL-Uplink Shared Channel (SCH), that is, a transport channel. Uplink data transmitted on the PUSCH may be a transport block, that is, a data block for the UL-SCH transmitted during a TTI. The transport block may include user data. Or, the uplink data may be multiplexed data. The multiplexed data may be the multiplexing of the transport block for the UL-SCH and channel status information. For example, the channel status information multiplexed into the data may be a CQI, a PMI, or an RI. Or, the uplink data may include only the channel status information.

Hereinafter, the multiple carrier system will be described.

Figure 6:
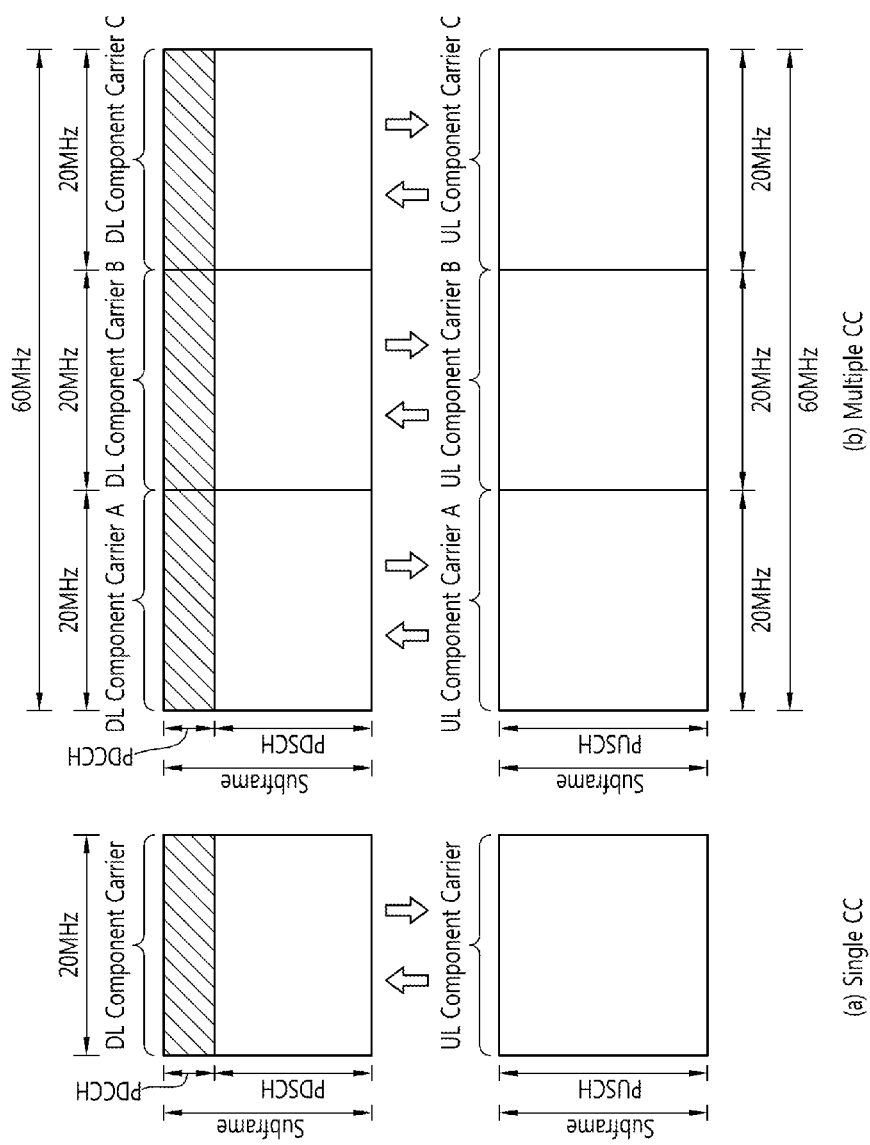
FIG. 6 is an example of comparing a single carrier system with a multiple subcarrier system.

FIG. 6 is an example of comparing a single carrier system with a multiple carrier system.

Referring to FIG. 6, the single carrier system supports only one carrier to the UE in the uplink and the downlink. A bandwidth of the carrier may be various, but the number of carriers allocated to the UE is one. On the contrary, in the multiple carrier system, a plurality of component carriers DL CCs A to C and UL CCs A to C may be allocated to the UE. For example, in order to allocate a bandwidth of 60 MHz to the UE, three 20-MHz component carriers may be allocated.

The multiple carrier system may be classified into a contiguous carrier aggregation system in which respective aggregated carriers are contiguous, and a non-contiguous carrier aggregation system in which the respective carriers are separated from each other. In this specification, the "multiple carrier system" includes both the case where the component carriers are contiguous and the component carriers are non-contiguous.

The component carrier targeted when one or more component carriers are collected may use the bandwidth used in an existing system for backward compatibility with the existing system as it is. For example, in a 3GPP LTE system, bandwidths of 1.4 MHz, 3 MHz, 5 MHz, 10 MHz, 15 MHz, and 20 MHz are supported, and in a 3GPP LTE-A system, a wide band of 20 MHz or more may be configured by using only the bandwidth of the 3GPP LTE system. Further, the wide band may be configured by defining a new bandwidth without using the bandwidth in the existing system as it is.

A system band of the wireless communication system is divided into a plurality of carrier-frequencies. Here, the carrier-frequency means a center frequency of a cell. Hereinafter, the cell may mean a downlink frequency resource and a uplink frequency resource. Further, the cell may mean a combination of the downlink frequency resource and an optional uplink frequency resource. Further, generally, in the case where the carrier aggregation (CA) is not considered, one cell may continuously exist as a pair of the uplink and downlink frequency resources. In order to transmit and receive packet data through a specific cell, first, the UE needs to complete a configuration for the specific cell. The configuration for the cell means a state in which reception of system information required for data transmission and reception for the corresponding cell is completed. For example, the configuration may include an entire process of receiving common physical layer parameters required for the data transmission and reception, MAC layer parameters, or parameters required for a specific operation in an RRC layer. The configured cell is in a state where transmission and reception of the packet are enabled immediately after only information that the packet data may be transmitted is received.

The configured cell may exist in an activation or deactivation state. Here, the activation means that the data is transmitted or received or in a ready state. The UE may monitor or receive a control channel PDCCH and a data channel PDSCH of the activated cell in order to verify a self-allocated resource (a frequency, a time, and the like).

The deactivation means that transmission or reception of the traffic data is impossible, and measurement or transmission/reception of minimum information is possible. The UE may receive system information (SI) required for receiving the packet from the deactivated cell. On the other hand, the UE does not monitor or receive a control channel PDCCH and a data channel PDSCH of the deactivated cell in order to verify the self-allocated resource (a frequency, a time, and the like).

The cell may be classified into a primary cell, a secondary cell, and a serving cell.

The primary cell means a cell operating in a primary frequency, and may mean a cell that performs an initial connection establishment procedure with the BS or a connection re-establishment process by the UE, or a cell indicated as the primary cell during a handover process. The secondary cell means a cell operating in a secondary frequency, and is first configured when RRC connection is established, and may be used to provide an additional radio resource.

The serving cell may be configured as the primary cell in the case of the UE in which the carrier aggregation (CA) is not configured or the CA may not be provided. In the case where the CA is configured, the term of the serving cell may be used to represent the primary cell and a set configured by one of all the secondary cells or a plurality of secondary cells. That is, the primary cell means one serving cell providing a security input and NAS mobility information, in an RRC establishment or re-establishment state. According to capabilities of the UE, at least one cell may be configured to form a serving cell set together with the primary cell, and the at least one cell is called the secondary cell. Accordingly, the set of the serving cells configured for one UE may be configured by only one primary cell, or by one primary cell and at least one secondary cell.

A primary component carrier (PCC) means a component carrier (CC) corresponding to the primary cell. The PCC is a CC in which the UE is early connected or RRC-connected with the BS, among many CCs. The PCC is a specific CC that performs connection or RRC-connection for signaling with respect to a plurality of CCs and manages UE context information which is connection information related to the UE. Further, the PCC is connected with the UE and continuously exists in the activation state in the case of an RRC connected mode.

A secondary component carrier means a CC corresponding to the secondary cell. That is, the SCC, as the CC allocated to the UE in addition to the PCC, is an extended carrier for additional resource allocation and the like of the UE in addition to the PCC, and may be divided into activation and deactivation states.

The downlink component carrier corresponding to the primary cell is called a downlink primary component carrier (DL PCC), and the uplink component carrier corresponding to the primary cell is called an uplink primary component carrier (UL PCC). Further, in the downlink, a component carrier corresponding to the secondary cell is called a DL secondary CC (DL SCC), and in the uplink, a component carrier corresponding to the secondary cell is called an uplink secondary CC (UL SCC).

The primary cell and the secondary cell may have the following characteristics.

First, the primary cell may be used for transmission of the PUCCH. Second, the primary cell is continuously activated, while the secondary cell may be a carrier activated/deactivated according to a specific condition. Third, when the primary cell experiences a radio link failure (RLF), the RRC re-establishment is triggered, but when the secondary cell experiences the RLF, the RRC re-establishment may not be triggered. Fourth, the primary cell may be changed by a security key or a handover procedure accompanied with a random access channel (RACH) procedure. Fifth, non-access stratum (NAS) information may be received through the primary cell. Sixth, the primary cell may be continuously configured by a pair of the DL PCC and the UL PCC. Seventh, a different component carrier (CC) for each UE may be configured as the primary cell. Eighth, procedures such as reconfiguration, adding, and removal of the primary cell may be performed by the RRC layer. In the addition of a new secondary cell, an RRC signaling to transmit system information of a dedicated secondary cell may be used.

The downlink component carrier may configure one serving cell, and the downlink component carrier and the uplink component carrier are connected to each other to configure one serving cell. However, the serving cell may not be configured by only one uplink component carrier. Activation/deactivation of the component carrier may be equal to a concept of the activation/deactivation of the serving cell. For example, if a serving cell 1 is configured by a DL CC1, the activation of the serving cell 1 may mean activation of the DL CC1. If a serving cell 2 is configured by connecting a DL CC2 and a UL CC2, the activation of the serving cell 2 may mean the activation of the DL CC2 and the UL CC2. In this regard, each component carrier may correspond to the cell.

The number of component carriers aggregated between the downlink and the uplink may be differently set. A case where the number of downlink CCs and the number of uplink CCs are the same as each other is called symmetric aggregation, and a case where the number of downlink CCs and the number of uplink CCs are different from each other is called asymmetric aggregation. Further, sizes (that is, bandwidths) of the CCs may be different from each other.

For example, when five CCs are used for the configuration of a 70 MHz band, the five CCs may be configured as 5 MHz CC (carrier #0)+20 MHz CC (carrier #1)+20 MHz CC (carrier #2)+20 MHz CC (carrier #3)+5 MHz CC (carrier #4).

As described above, the multiple carrier system may support a plurality of component carriers (CCs) unlike the single carrier system. That is, one UE may receive a plurality of PDSCHs through a plurality of DL CCs.

Meanwhile, the multiple carrier system may support cross-carrier scheduling. The cross-carrier scheduling may be a scheduling method that may perform resource allocation of the PDSCH transmitted through other component carriers through the PDCCH transmitted through a specific component carrier and/or resource allocation of the PUSCH transmitted through other component carriers in addition to the component carrier which is basically linked with the specific component carrier. That is, the PDCCH and the PDSCH may be transmitted through different downlink CCs, and the PUSCH may be transmitted through another uplink CC which is not the uplink CC linked with the downlink CC transmitted by the PDCCH including a UL grant. As such, the system supporting the cross-carrier scheduling may need a carrier indicator indicating that the PDCCH notifies through which DL CC/UL CC the PDSCH/PUSCH providing control information is transmitted. A field including the carrier indicator may be hereinafter called a carrier indication field (CIF).

The multiple carrier system supporting the cross-carrier scheduling may include a carrier indication field (CIF) in an existing DCI format. In the system supporting the cross-carrier scheduling, for example, the LTE-A system, since the CIF is added to the existing DCI format (that is, the DCI format used in the LTE), 1 to 3 bits may be extended, and the PDCCH structure may reuse an existing coding method, a resource allocating method (that is, resource mapping based on the CCE), and the like.

Figure 7:
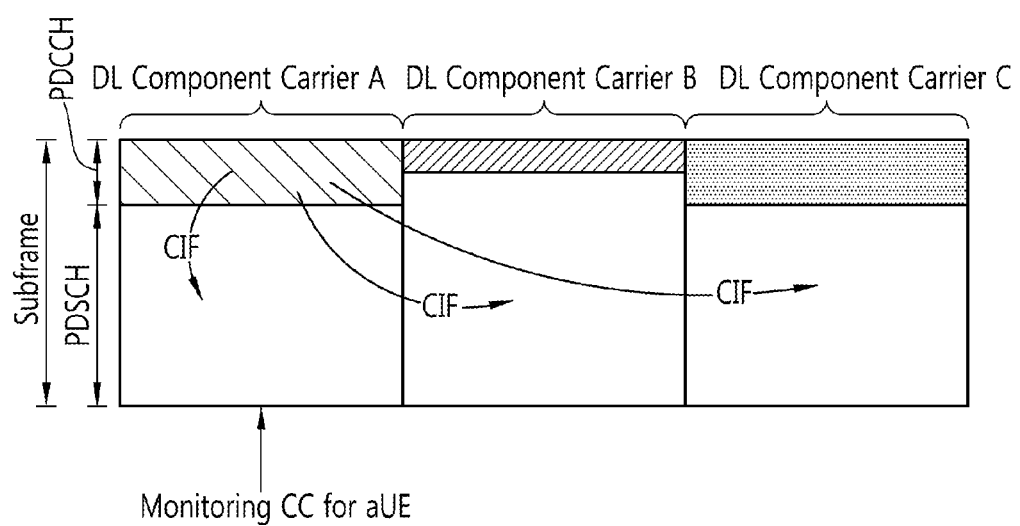
FIG. 7 shows an example of a subframe structure for scheduling a cross-carrier in a multiple carrier system.

FIG. 7 illustrates an example of a subframe structure for cross-carrier scheduling in the multiple carrier system.

Referring to FIG. 7, the BS may set a PDCCH monitoring DL CC set. The PDCCH monitoring DL CC set is configured by some DL CCs among all the aggregated DL CCs, and when the cross-carrier scheduling is set, the UE may perform PDCCH monitoring/decoding with respect to only the DL CC included in the PDCCH monitoring DL CC set. In other words, the BS transmits the PDCCH for the PDSCH/PUSCH to be scheduled through only the DL CC included in the PDCCH monitoring DL CC set. The PDCCH monitoring DL CC set may be set UE-specifically, UE group-specifically, or cell-specifically.

FIG. 7 illustrates an example in which three DL CCs DL CC A, DL CC B, and DL CC C are aggregated and the DL CC A is set as the PDCCH monitoring DL CC. The UE may receive the DL grant for the PDSCH of the DL CC A, the DL CC B, and the DL CC C through the PDCCH of the DL CC A. The CIF is included in the DCI transmitted through the PDCCH of the DL CC A, and as a result, the CIF may indicate for which DL CC the corresponding DCI is a DCI.

Hereinafter, the control information transmitted through the uplink will be described according to this specification.

The method and apparatus according to this specification transmit the control information through the uplink. The control information includes an ACK or NACK signal (that is, ACK/NACK bit) for HARQ and channel state information (CSI).

The ACK/NACK signal/bit for HARQ may be an ACK/NACK signal corresponding to the downlink data packet transmitted through the PDSCH. The bit number of the ACK/NACK signal may be determined according to a length of a codeword used for the downlink transmission.

The CSI bit may include a channel quality indicator (CQI). The CQI may be generated by various methods. For example, the various methods include a method of quantizing and feed-backing the channel state as it is, a method of calculating and feed-backing a signal to interference plus noise ratio (SINR), a method of notifying a state which is actually applied to the channel such as a modulation coding scheme (MCS), and the like. In more detail, the CQI value may be the SINR, a carrier to interference and noise ratio (CINR), a bit error rate (BER), a frame error rate (FER), and the like of the channel, and values obtained by converting the SINR, the CINR, the BER, and the FER to transmittable data.

The CSI bit may include a rank indication (RI). The RI is information on the number of layers recommended by the UE. That is, the RI represents the number of streams used in spatial multiplexing. The RI may be fed-back only in the case where the UE operates in an MIMO mode using the spatial multiplexing.

The CSI bit may include a precoding matrix index (PMI). The PMI provides information on a precoding matrix in precoding based on a code book. That is, the PMI is related to the multiple input multiple output (MIMO). The feed-backing of the PMI in the MIMO may be called a closed loop MIMO.

As described above, the ACK/NACK bit and the CSI bit may be transmitted to the PUSCH or the PUCCH. Hereinafter, an example transmitted to the PUCCH will be described.

The PUCCH may transmit bits for scheduling request (SR) in addition to the ACK/NACK bit and the CSI bit. A content of the control information included in the PUCCH, that is, uplink control information (UCI) transmitted through the PUCCH may be determined according to a format of the PUCCH.

The following Table illustrates a UCI according to the PUCCH format.

Figure 8:
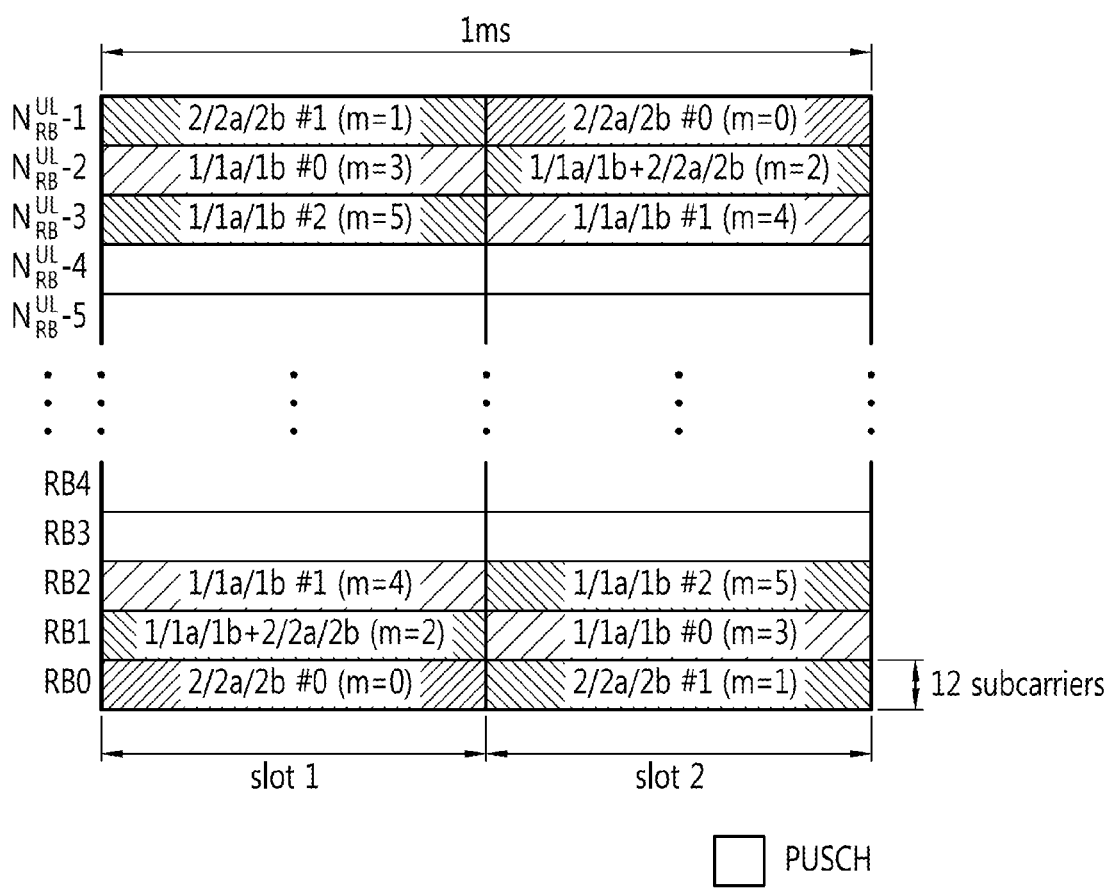
FIG. 8 shows a radio resource in which a control signal is mapped according to a PUCCH format.

FIG. 8 illustrates a radio resource in which a control signal is mapped according to a PUCCH format.

As illustrated in FIG. 8, a PUCCH format 2/2a/2b is positioned at band-edge RBs. The corresponding positions may be represented by m=0, 1. In addition, a mixed PUCCH RB is allocated to a position (m=2) which is contiguous at the edge RB. Further, SR/HARQ-ACK/NACK may be disposed at a position (m=3) which is contiguous at the edge RB.

As illustrated in Table 1, in the case of the PUCCH format 2/2a/2b, CQI information of 20 bits may be included. In detail, CQI information of 10 bits is included in a first slot of the subframe, and information of remaining 10 bits is included in a second slot of the same subframe. The CQI information of 10 bits allocated to each slot is subjected to (20,k) reed-muller coding. After ½ puncturing is applied to the bits in which the reed-muller coding is performed, QPSK modulation is applied.

The (20,k) reed-muller coding performs coding according to the following Table 2 and the following Equation 1, as a linear block code. The following Table 2 represents basis sequences for the (20,k) reed-muller coding. In this case, input bits may be represented as and (20,k) reed-muller coded output may be represented as $a_0, a_1, a_2, \ldots, a_A$, and (20,k) reed-muller coded output may be represented as $b_0, b_1, b_2, \ldots b_B$. The input bits of the (20,k) reed-muller coding according to the Table 2 are maximum 13 bits. Further, the coded output is 20-bit sequences.

$$b_i = \left( \sum_{n=0}^{A-1} (a_n \cdot M_{i,n}) \right) \bmod 2, \qquad \text{[Equation 1]}$$

where $i = 0, 1, 2, \ldots, B-1$

TABLE 1

| PUCCH format | Uplink Control Information (UCI) |
|---|---|
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |

TABLE 2-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 0 | 1 | 0 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Figure 9:
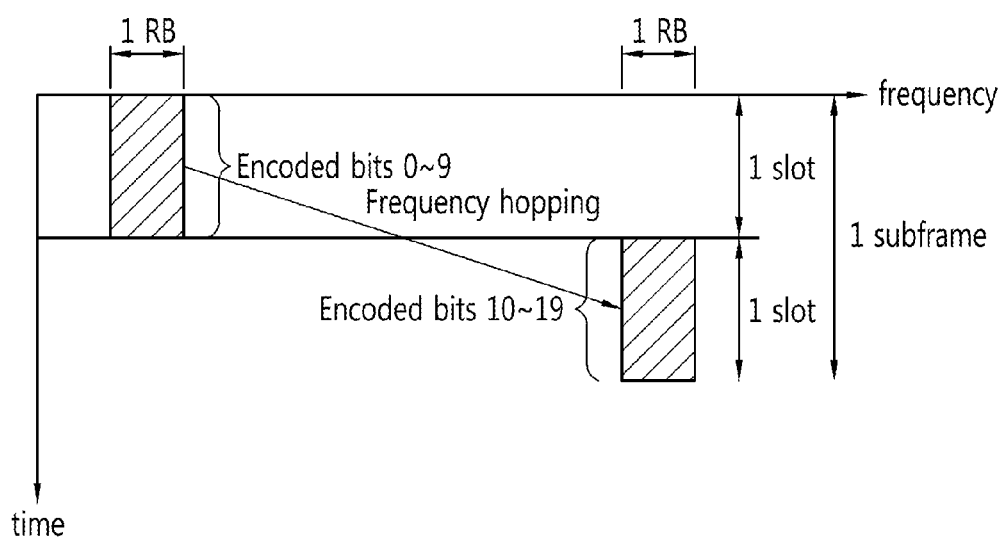
FIG. 9 shows a slot corresponding to an output bit of 20 bits generated by Equation 1 and Table 2.

FIG. 9 illustrates a slot corresponding to an output bit of 20 bits generated by Equation 1 and Table 2.

As described above, the first 10 bits among the output bit of 20 bits correspond to the first slot, and the last 10 bits correspond to the second slot, and as illustrated in the drawing, frequency hopping is applied to each slot.

The reed-muller coding according to the Table 2 is used to feed-back the channel state information (CSI) through the PUCCH. If the channel state information (CSI) is fed-back through the PUCCH, (32, A) reed-muller coding according to the following Table 2 and the Equation 1 is used. Table 3 represents basis sequences for the (32, A) reed-muller coding.

According to the following Table 3, input bits need to be 11 bits or more, and coded output bits are determined as 32 bits.

In the LTE-A, in order to transmit UCI (ACK/NACK and SR) bits of maximum 21 bits, the PUCCH format 3 is introduced, and when the PUCCH format 3 is used, coded bits of 48 bits may be transmitted in a normal CP situation.

The PUCCH format 3 uses (32, A) reed-muller coding (RM coding) based on the Table 3 and the Equation 1. When the UCI bit number is 11 or less, after the 32, A) reed-muller coding (RM coding) is used, circular repetition may be used so as to increase the coded output according to the bit number (that is, 48 bits) of the PUCCH format 3. If the UCI bits are more than 11 bits, the coding based on the Table 3 and the Equation 1 may not be performed. In the coding according to the Table 3, a maximum length of the input bit is 11. To this end, dual RM coding is proposed.

Figure 10:
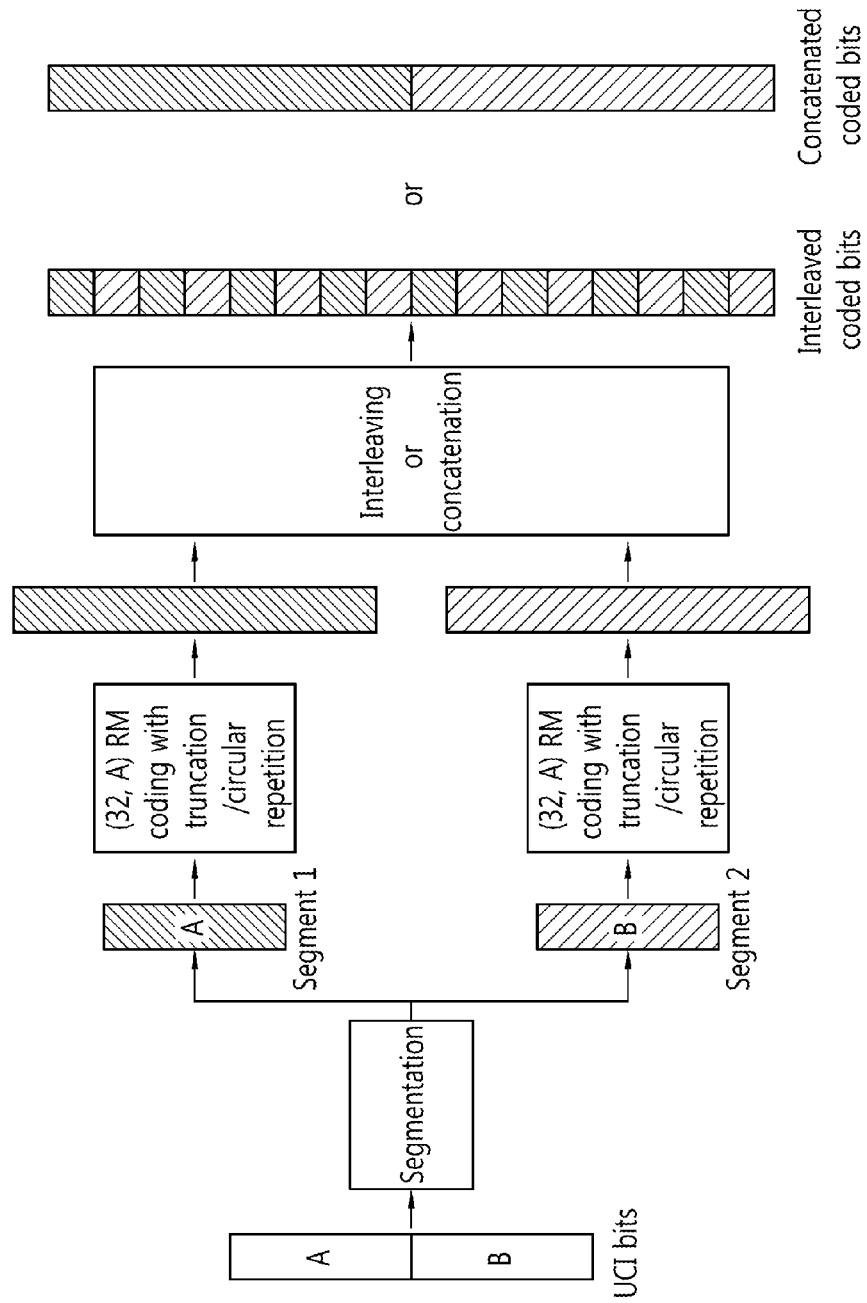
FIG. 10 shows dual RM coding.

FIG. 10 illustrates dual RM coding.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0  | 1 | 1 | 0 | 0 | 0 | 0 | 0 | 0 | 0 | 0 | 1 |
| 1  | 1 | 1 | 1 | 0 | 0 | 0 | 0 | 0 | 0 | 1 | 1 |
| 2  | 1 | 0 | 0 | 1 | 0 | 0 | 1 | 0 | 1 | 1 | 1 |
| 3  | 1 | 0 | 1 | 1 | 0 | 0 | 0 | 0 | 1 | 0 | 1 |
| 4  | 1 | 1 | 1 | 1 | 0 | 0 | 0 | 1 | 0 | 0 | 1 |
| 5  | 1 | 1 | 0 | 0 | 1 | 0 | 1 | 1 | 1 | 0 | 1 |
| 6  | 1 | 0 | 1 | 0 | 1 | 0 | 1 | 0 | 1 | 1 | 1 |
| 7  | 1 | 0 | 0 | 1 | 1 | 0 | 0 | 1 | 1 | 0 | 1 |
| 8  | 1 | 1 | 0 | 1 | 1 | 0 | 0 | 1 | 0 | 1 | 1 |
| 9  | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

A technical characteristic of the aforementioned PUCCH format 2 is applied to the 3GPP LTE system, and in the 3GPP LTE-A, a PUCCH format 3 is introduced.

According to the Table 3, since a (32,A) RM code basis sequence is only 11, when the input bits are more than 11 bits, the coding may not be performed according to the Table 3. Accordingly, like FIG. 10, two coded output bits are generated by using two (32,A) RM coding blocks.

In addition, rate matching is performed. That is, in order to short the coded bits according to the bit number (that is, 48 bits) required for the PUCCH format 3, the coded bits are truncated. In addition, interleaving is performed.

In the case where the UCI of maximum 21 bits is transmitted to not the PUCCH but the PUSCH, when the UCI bit number is 11 or less, after the (32,A) RM coding according to the Table 3 is performed, the truncation or the circular repetition is performed according to a PUSCH code rate. When the UCI is transmitted to the PUSCH, in the case where the UCI is more than 11 bits, two coded bit sequences are generated by using the dual RM, and the truncation or the circular repetition is performed so as to adjust the sequences to the PUSCH code rate.

In the case where the use of the PUSCH format 3 is configured in the subframe in which the scheduling request (SR) is included, when the SR and the ACK/NACK are transmitted through the PUSCH format 3 or the PUSCH, the ACK/NACK bits are first disposed and the SR bits are disposed next to the ACK/NACK bits.

Figure 11:
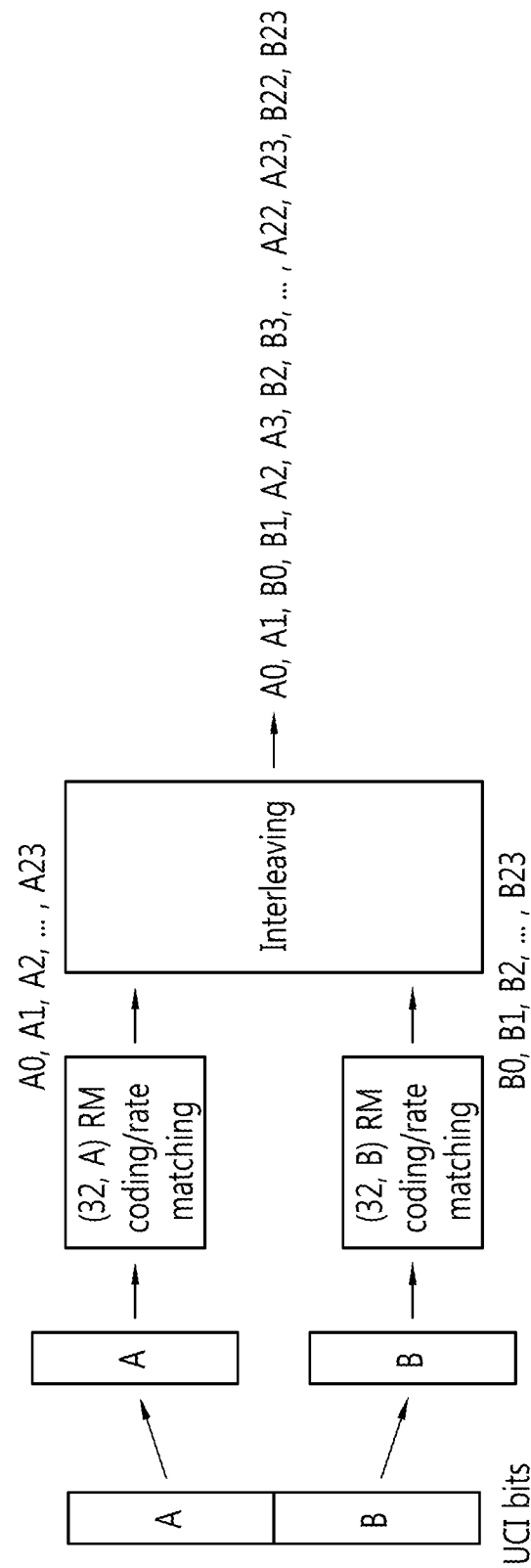
FIG. 11 shows an interleaving technique according to dual RM coding.

FIG. 11 illustrates an interleaving technique according to dual RM coding.

As illustrated in FIG. 11, data blocks (that is, input bit sequences) with lengths A and B are input to a (32, A) RM encoder and a (32, B) RM encoder. The (32, A) RM encoder outputs a bit sequence of 32 bits, but A0, A1, . . . , and A23 are finally generated by rate matching. The 32, B) RM encoder also generates finally B0, B1, . . . , and B23. The output bits are sequentially output by two bits to form a bit string of A0, A1, B0, B1, A2, A3, B2, B3, . . . , A22, A23, B22, B23.

QPSK modulation is applied to the interleaved bit string, the first 24 bits (that is, 12 QPSK symbol) are transmitted through the first slot, and the last 24 bits (that is, 12 QPSK symbol) are transmitted through the second slot.

This specification proposes a method and apparatus of transmitting control information with improved performance.

In detail, this specification proposes a technique of transmitting control information through the uplink in a wireless communication system which supports a plurality of carriers related to carrier coupling (CC). The control information transmitted through the uplink may be ACK/NACK bits for HARQ and CSI bits. The technique according to this specification uses different RM coding blocks with respect to the ACK/NACK bits and the CSI bits.

It is general that the ACK/NACK bits and the CSI bits satisfy different performance requirements. In detail, the ACK/NACK bits need to satisfy a higher performance requirement, but is enough to satisfy a lower performance requirement than the CSI. However, in an example of FIG. 11, different kinds of bits may be coded by the same RM coding block. In order to improve the aspect, a technique using different RM coding blocks with respect to the ACK/NACK bits and the CSI bits is proposed.

Further, this specification proposes a technique of transmitting a plurality of ACK/NACK bits and CSI bits corresponding to a plurality of carriers used for the carrier coupling (CC). For example, an example of FIG. 11 is just an example of the ACK/NACK bits and the CSI bits, and does not include the technique of transmitting the CSI bits. Further, a general technique of coding the ACK/NACK bits and the CSI bits does not consider the carrier coupling (CC). The technique according to this specification may improve the aspect.

Further, the technique according to this specification proposes a plurality of RM coding blocks using the same basis sequence. For example, the technique according to this specification proposes a plurality of RM coding blocks commonly using the Table 3 and the Equation 1. In this case, the plurality of RM coding blocks outputs a bit sequence of the same length (that is, 32 bits). However, the bit sequence of 32 bits may be adjusted to sequences of different lengths by the rate matching through the truncation or the circular repetition.

Further, the technique according to this specification is not limited to an existing standard. For example, a length of the output sequence that is output from a first RM coding block for the ACK/NACK bits to perform the rate matching needs not to be 24 bits. Further, a length of the output sequence that is output from a second RM coding block for the CSI bits to perform the rate matching needs not to be 24 bits.

Figure 12:
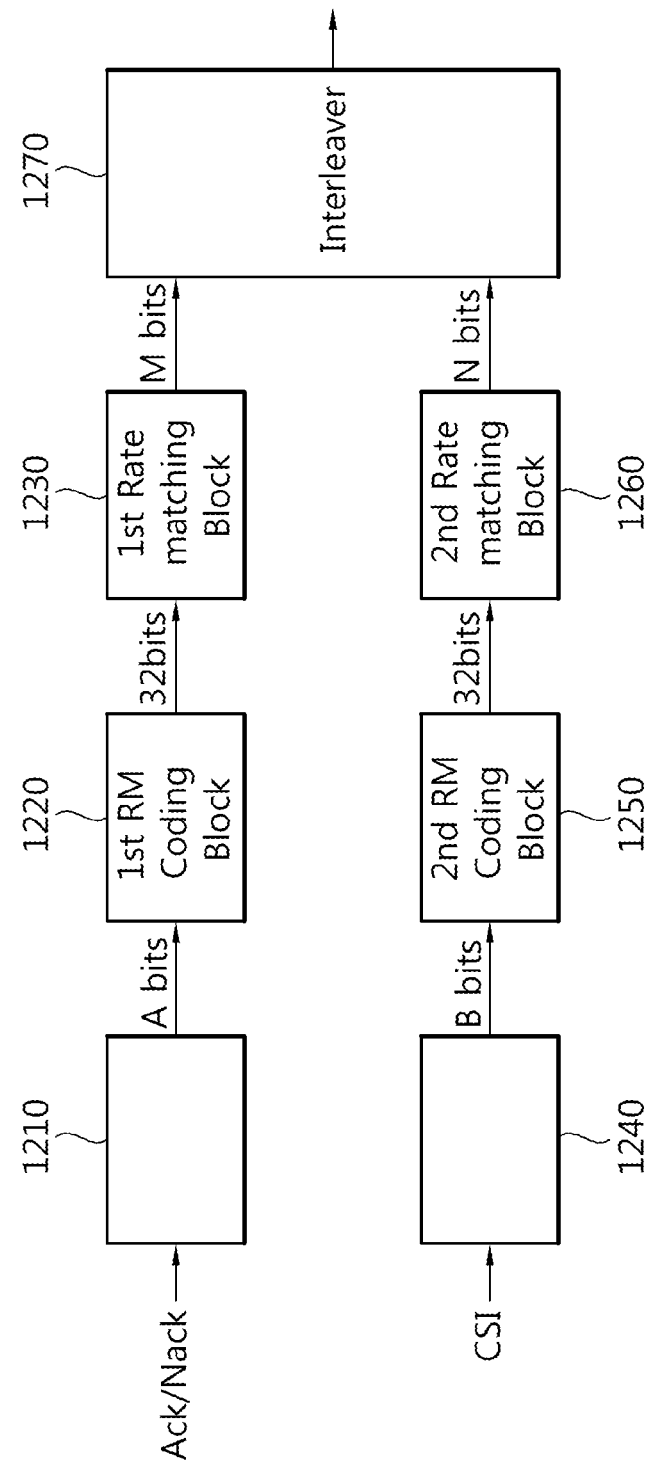
FIG. 12 shows an example of a method of coding an ACK/NACK bit and a CSI bit.

FIG. 12 shows an example of a technique of coding ACK/NACK bits and CSI bits.

An example of FIG. 12 relates to a technique of multiplexing CSI bits and ACK/NACK bits to transmit the multiplexed bits to an uplink control channel (for example, PUCCH). For example, the CSI bits may be limited to a periodic CSI except for aperiodic CSI bits. Further, in the example of FIG. 12, the uplink (UL) channel on which the control information of the ACK/NACK bits and the CSI bits are multiplexed and transmitted is represented as the PUCCH format 3. However, for multiplexing of the plurality of ACK/NACK bits and CSI bits, different PUCCH formats may be used. For example, the different PUCCH formats may be applied even in the case of transmitting a control channel by using PUCCH format 3 with reduced SF', PUSCH', and the like. In the case where the example of FIG. 12 is applied to the PUCCH format 3, an amount of bits transmitted from one subframe is 48 bits, and in the case of designing and transmitting a new PUCCH format, an amount of bits transmitted through the subframe may be any size (that is, X bits). As described above, the following example may be applied even in the cases except for 48 bits.

Since the CSI bits and the ACK/NACK bits need to satisfy different performance requirements, when the CSI bits and the ACK/NACK bits are transmitted to the PUCCH format 3, even though a total sum of the CSI bits and the ACK/NACK bits is less than 12 bits, dual RM coding is used. That is, according to the example of FIG. 12, the CSI bits and the ACK/NACK bits need to be independently coded and transmitted. In this case, the CSI bits and the ACK/NACK bits are rate-matched according to each performance requirement. In the existing PUCCH format 3, the output (output to which the rate matching is applied) of each dual RM encoder is determined as 24 bits, but according to the example of FIG. 12, the number of CSI bits and ACK/NACK bits is variable. Accordingly, according to the performance requirement, the number of CSI bits and ACK/NACK bits is rate-matched as 24 bits or more or 24 bits or less, and the sum of output coded bit numbers may be 48 bits. Generally, the performance requirement of the ACK/NACK is BER $10^{-3}$ or less, and the performance requirement of the CSI is BLER $10^{-1}$ or less. Like the example of FIG. 12, the coded bits are finally transmitted through slot 1 and slot 2 of the subframe to obtain a diversity gain. When equal modulation symbols are transmitted to the slot 1 and the slot 2 of one subframe, the ACK/NACK bits or the CSI bits may be designed to have an equal transmission error rate. To this end, in the case where QPSK modulation is assumed, the output coded bits of the ACK/NACK bits or the CSI bits may be a multiple of 4. Meanwhile, when the ACK/NACK bits or the CSI bits are designed so as not to form one modulation symbol, the output coded bits of the ACK/NACK bits or the CSI bits are determined as a multiple of 2. In the case where there is no limitation to a length of the output coded bits, the number of modulation symbols transmitted through one modulation symbol by the ACK/NACK bits or the CSI bits becomes at least one.

As illustrated in FIG. 12, the ACK/NACK bits are input to the first RM coding block (in detail, the (32, A) RM encoder). Further, the length of the ACK/NACK bits may be determined as 2≤A≤11. That is, the ACK/NACK bits may be in plural. In the example of FIG. 12, since the ACK/NACK bits related to the plurality of carriers related with the carrier coupling (CC) are supported and the ACK/NACK bits may be set with respect to each carrier (for example, each component carrier or each cell), when the carriers are coupled with each other, the ACK/NACK bits are set to many numbers. For example, one of the ACK/NACK bits supports the primary cell, and the other bit may support the secondary cell. Further, the ACK/NACK bits may include the SR bits in the SR subframe. The input of the second coding block (in detail, the (32, B) RM encoder) is the CSI bits, and the length thereof may be determined by 1≤B≤11. Even though the component carrier are coupled with each other, since only one bit of the CSI information may be fed-back according to a priority, the CSI bits may be minimum one bit. After the ACK/NACK input is coded, the length of the output coded bits, in which the rate matching is performed is set as M, and may be expressed by $A_0, A_1, \ldots, A_{M-1}$. Further, after the CSI input is coded, the length of the output coded bits, in which the rate matching is performed is set as N(=48−M), and may be expressed by $B_0, B_1, \ldots, B_{N-1}$.

In more detail, the ACK/NACK bits are obtained by a first block 1210, and coded by a first RM coding block 1220. Since the first RM coding block 1220 is based on the Table 3, the length of the coded bit sequence is determined as 32 bits. The bit sequence is converted to an M bit output by a first rate matching block 1230. In detail, the first rate matching block 1230 truncates or the circular-repeats the sequence with a length of 32 bits to generate the output coded bits of M bits. The output of the first rate matching block 1230 may be expressed by $A_0, A_1, \ldots, A_{M-1}$.

Meanwhile, the CSI bits are obtained by a second block 1240, and coded by a second RM coding block 1250 which is separated from the first RM coding block 1220. Since the second RM coding block 1250 is based on the Table 3, the length of the coded bit sequence is determined as 32 bits. The bit sequence is converted to an N bit output by a second rate matching block 1260. That is, the second rate matching block 1260 truncates or the circular-repeats the sequence with a length of 32 bits to generate the output coded bits of N bits.

It may be assumed that M and N are multiples of 2 or multiples of 4. The modulation may be QPSK modulation. Hereinafter, a method of generating a bit string to which interleaving is applied will be described on the basis of four techniques.

First Interleaving Technique

Figure 13:
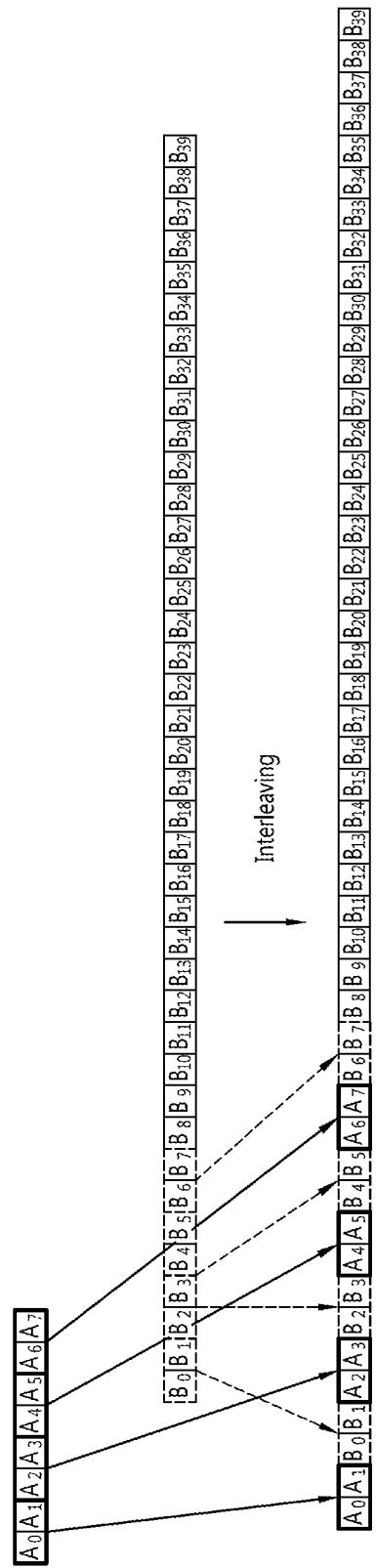
FIG. 13 shows a first interleaving technique.

FIG. 13 shows a first interleaving technique.

As described above, in an example of FIG. 13, the length of the bit sequence generated in the first rate matching block 1230 is set as 8, and the length of the bit sequence generated in the second rate matching block 1260 is set as 40. That is, the example is an example in which the length of the output coded bits for the ACK/NACK bits is determined as 8, and the length of the output coded bits for the CSI bits is set as 40.

In the example of FIG. 13, the interleaving is performed by alternatively extracting (or selecting) the output coded bits $(A_0, A_1, \ldots, A_{M-1})$ corresponding to the ACK/NACK bits and the output coded bit $(B_0, B_1, \ldots, B_{N-1})$ corresponding to the CSI bits by a modulation symbol unit (a 2-bit unit in the case of the QPSK).

As illustrated in FIG. 13, the first 2 bits (modulation symbol unit) of the output coded bits corresponding to the ACK/NACK bits are selected, and then the first 2 bits of the output coded bit corresponding to the CSI bits are selected. Further, thereafter, the ACK/NACK bits and the CSI bits are alternatively extracted/selected. Finally, the interleaved result is the same as the following Equation 2 according to the example of FIG. 13.

$$A_0, A_1, B_0, B_1, \ldots, A_{M-2}, A_{M-1}, B_{M-2}, B_{M-1}, B_M, B_{M+1}, \ldots, B_{N-2}, B_{N-1} \quad \text{[Equation 2]}$$

In Equation 2, when M+N=48 is satisfied, the first 24 bits of Equation 2 are transmitted through the first slot of the subframe, and the last 24 bits of Equation 2 are transmitted through the second slot of the subframe.

The example of FIG. 13 is expressed by a pseudo code as follows.

```
Set i, j = 0
    while i < 4N_SC^RB  /* e.g, N_SC^RB = 12 */
        while j < r /* r = min(M,N) */
            b_i = A_j, b_{i+1} = A_{j+1}
            b_{i+2} = B_j, b_{i+3} = B_{j+1}
            i = i+4
            j = j+2
        end while
        if M<N
            b_i = B_j, b_{i+1} = B_{j+1}
        else if M>N
            b_i = A_j, b_{i+1} = A_{j+1}
        end if
        i = i+2
        j = j+2
    end while
```

In this case, the bit string $b_0, b_1, \ldots, b_{47}$ (the interleaved bit sequence expressed by the form of Equation 2) is transmitted to the PUCCH format 3 to become the input of the PUCCH.

Second Interleaving Technique

Figure 14:
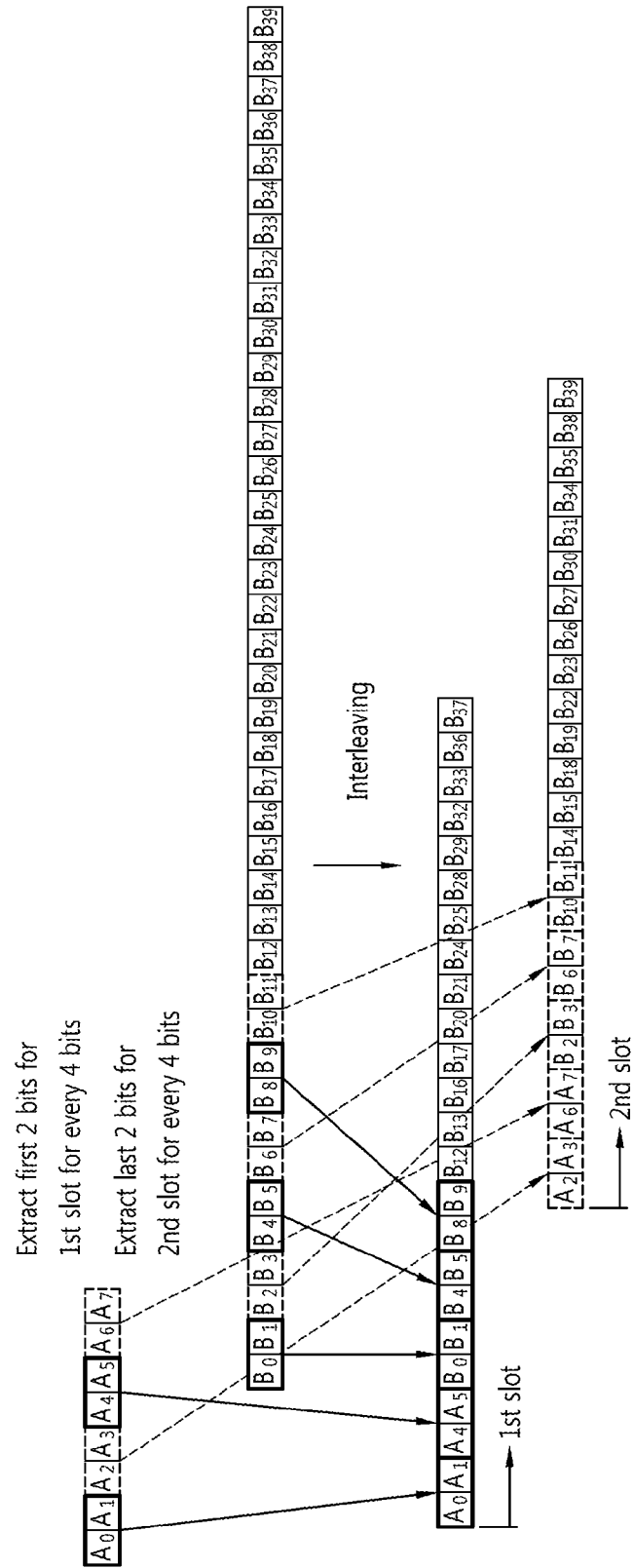
FIG. 14 shows a second interleaving technique.

FIG. 14 shows a second interleaving technique.

As described above, in an example of FIG. 14, the length of the bit sequence generated in the first rate matching block 1230 is set as 8, and the length of the bit sequence generated in the second rate matching block 1260 is set as 40. That is, the example is an example in which the length of the output coded bits for the ACK/NACK bits is determined as 8, and the length of the output coded bits for the CSI bits is set as 40.

The example of FIG. 14 is an example in which the output coded bits $(A_0, A_1, \ldots, A_{M-1})$ corresponding to the ACK/NACK bits and the output coded bit $(B_0, B_1, \ldots, B_{N-1})$ corresponding to the CSI bits are equally disposed at the 1st slot and the 2nd slot, respectively. That is, the example is an example in which the number of bits allocated to the 1st slot and the number of bits allocated to the 2nd slot among the output coded bits corresponding to the ACK/NACK bits may be the same as each other. Further, the example is an example in which the number of bits allocated to the 1st slot and the number of bits allocated to the 2nd slot among the output coded bits corresponding to the CSI bits may be the same as each other.

In detail, the example exemplifies a method of generating the bit string by connecting the remaining bit strings after extracting the bit string corresponding to one modulation symbol for every two modulation symbols (every 4 bits in the case of the QPSK) by connecting the ACK/NACK bits and the CSI output coded bits. That is, in order to make the bit sequence allocated to the 1st slot, 2 bits are extracted every 4 bits. In this case, the remaining bits of 2 bits among 4 bits are allocated to the 2nd slot.

Finally, the interleaved result is the same as the following Equation 3 according to the example of FIG. 14.

i) In the case where M is a multiple of 4 (M<N):

$$A_0,A_1,A_4,A_5, \ldots ,A_{M-4},A_{M-3},B_0,B_1,B_4,B_5, \ldots ,B_{N-4},$$
$$B_{N-3},A_2,A_3,A_6,A_7, \ldots ,A_{M-2},A_{M-1},B_2,B_3,B_6,$$
$$B_7, \ldots ,B_{N-2},B_{N-1}$$

ii) In the case where M is a multiple of 2, not a multiple of 4 (M<N):

$$A_0,A_1,A_4,A_5, \ldots ,A_{M-2},A_{M-1},B_2,B_3,B_6,B_7, \ldots ,B_{N-2},$$
$$B_{N-1},A_2,A_3,A_6,A_7, \ldots ,A_{M-4},A_{M-3},B_0,B_1,B_4,$$
$$B_5, \ldots ,B_{N-4},B_{N-3}$$ [Equation 3]

In the case of M>N, the bit string may be generated by the same method. The above interleaving operation may be implemented by a general block interleaver.

The second interleaving technique is expressed by a pseudo code as follows.

```
Let b1 = [b1₀, b1₁, ..., b1₄₇] = [A₀, A₁, ..., A_{M-1}, B₀, B₁, ..., B_{N-1}]
Set i, j=0
while j<48
    b2_j =[b1_j b1_{j+1}]
    i=i+1
    j=j+2
end while /* b1 = [b2₀, b2₁, ..., b2₂₃] */
```

Write the interleaver input vector sequence b1, k=0, 1, . . . , 23, into the 12×2 matrix row by row starting with the vector $b3_0$:

$$\begin{bmatrix} \underline{b3}_0 & \underline{b3}_1 \\ \vdots & \vdots \\ \underline{b3}_{22} & \underline{b3}_{23} \end{bmatrix}$$

```
Set k= 0
while k<24
    b3_k = b2_k
    k = k + 1
end while
```

The output of the block interleaver is the $b=[b4_0, b4_1, \ldots, b4_{23}]$ read out column by column from the 12×2 matrix starting with the vector $b3_0$.

```
Set i, k = 0
while i<48
    [bi bi+1] = b4_k
    i=i+2
    k=k+1
end while /* b = [b₀, b₁, ..., b₄₇] */
```

In this case, the bit string $b_0, b_1, \ldots, b_{47}$ (the interleaved bit sequence expressed by the form of Equation 3) is transmitted to the PUCCH format 3 to become the input of the PUCCH.

When each of the RM encoding/rate matching results of the ACK/NACK bits and the CSI bits is $A_0, A_1, \ldots, A_{M-1}$, $B_0, B_1, \ldots, B_{N-1}$, in the example of FIG. 14, the $A_0$ bit may become the first bit of the interleaved output. That is, the $A_0$ bit may become an MSB of the interleaved bit sequence. As a result, when the length of the coded bits corresponding to the ACK/NACK bits or the coded bits corresponding to the CSI bits is smaller than 24, the corresponding coded bits are transmitted to the entire subframe by using the PUCCH format 3.

When the ACK/NACK bits and the CSI bits are simultaneously transmitted by using the PUCCH format 3, the length of the ACK/NACK bits and the length of the CSI bits (for example, the length of the output coded bits corresponding to the ACK/NACK bits and the length of the output coded bits corresponding to the CSI bits) are varied, and as a result, the ACK/NACK bits and the CSI bits are transmitted to the UE by using higher layer signaling such as RRC signaling or the PDCCH.

General Dual RM encoding is used when the length of the ACK/NACK bits is larger than 11, and the ACK/NACK input bit strings are alternatively input to each of two RM encoder by one bit to be encoded. According to the exemplary embodiment of this specification, since the ACK/NACK bits and the CSI bits are independently encoded, when only the ACK/NACK bits are input, an apparatus for operating equivalently with an existing apparatus may be needed as follows.

An input bit string of one RM encoder of the two RM encoders is expressed by $a_0, a_1, \ldots, a_{K-1}$, and an input bit string of the other RM encoder may be assumed as $b_0, b_1, \ldots, b_{L-1}$. In this case, K+L>11 may be set. When the input for the two RM encoders is the ACK/NACK bits which are larger than 11 bits, the ACK/NACK bits are alternatively input to the two RM encoders after the same operation as the pseudo code below to obtain the same input bit pattern as the related art.

```
Set i,j=0
while i<K+L
    while i< r /* r= min(K,L) */
        c_i = a_j, c_{i+1} = b_j
        i=i+2
        j=j+1
    end while
    if K<L
        c_i = b_j, c_{i+1}=b_{j+1}
    else if K>L
        c_i = a_j, c_{i+1}=a_{j+1}
    end if
    i=i+2
    j=j+1
end while
```

Third Interleaving Technique

Figure 15:
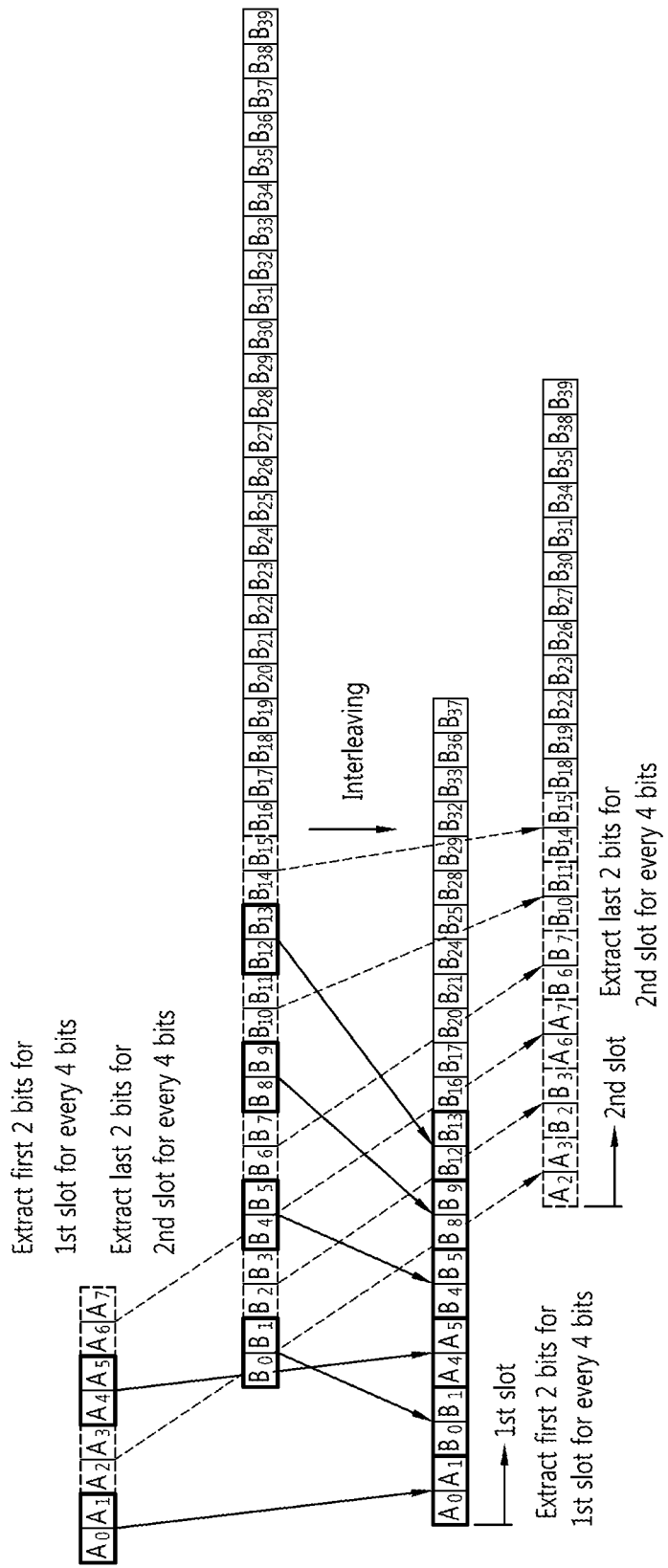
FIG. 15 shows a third interleaving technique.

FIG. 15 shows a third interleaving technique. The third interleaving technique is a method that combines the first interleaving technique and the second interleaving technique.

The example of FIG. 15, like the example of FIG. 14, is an example in which the output coded bits ($A_0, A_1, \ldots, A_{M-1}$) corresponding to the ACK/NACK bits and the output coded bit ($B_0, B_1, \ldots, B_{N-1}$) corresponding to the CSI bits are equally disposed at the 1st slot and the 2nd slot, respectively. That is, the example is an example in which the number of bits allocated to the 1st slot and the number of bits allocated to the 2nd slot among the output coded bits corresponding to the ACK/NACK bits may be the same as each other. Further, the example is an example in which the number of bits allocated to the 1st slot and the number of bits allocated to the 2nd slot among the output coded bits corresponding to the CSI bits may be the same as each other.

As illustrated in FIG. 15, the output coded bits corresponding to the ACK/NACK bits and the output coded bits corresponding to the CSI bits are connected to each other. In addition, after bits strings corresponding one modulation symbol for every two modulation symbols (every 4 bits in the case of QPSK modulation) with respect to the ACK/NACK bits and the CSI bits (in more detail, the output coded bits) are extracted (after 2 bits are extracted in the case of the QPSK modulation), the remaining bit strings are connected to each other to generate the bit strings.

That is, in the case of the QPSK modulation, for every 4 bits for the output coded bits corresponding to the ACK/NACK bits, the first 2 bits are allocated to the 1st slot and the last 2 bits are allocated to the 2nd slot. Further, the same operation is applied to the output coded bits corresponding to the CSI bits. When such an operation is alternatively applied to the output coded bits corresponding to the ACK/NACK bits and the output coded bits corresponding to the CSI bits, the result of FIG. 15 may be obtained.

Finally, the interleaved result is the same as the following Equation 4 according to the example of FIG. 15.

i) In the case where M is a multiple of 4 (M<N):

$A_0, A_1, B_0, B_1, A_4, A_5, B_4, B_5, \ldots, A_{M-4}, A_{M-3}, B_{N-4}, B_{N-3},$
$A_2, A_3, B_2, B_3, A_6, A_7, B_6, B_7, \ldots, A_{M-2}, A_{M-1}, B_{N-2},$
$B_{N-1}$ ii) In the case where M is a multiple of 2, not a multiple of 4 (M<N):

$A_0, A_1, B_0, B_1, A_4, A_5, B_4, B_5, \ldots, A_{M-2}, A_{M-1}, B_{M-2}, B_{M-1},$
$A_2, A_3, B_2, B_3, A_6, A_7, \ldots, A_{M-4}, A_{M-3}, \ldots, B_{M-4},$
$B_{M-3}, B_{N-4}, B_{N-3}$ [Equation 4]

Fourth Interleaving Technique

Figure 16:
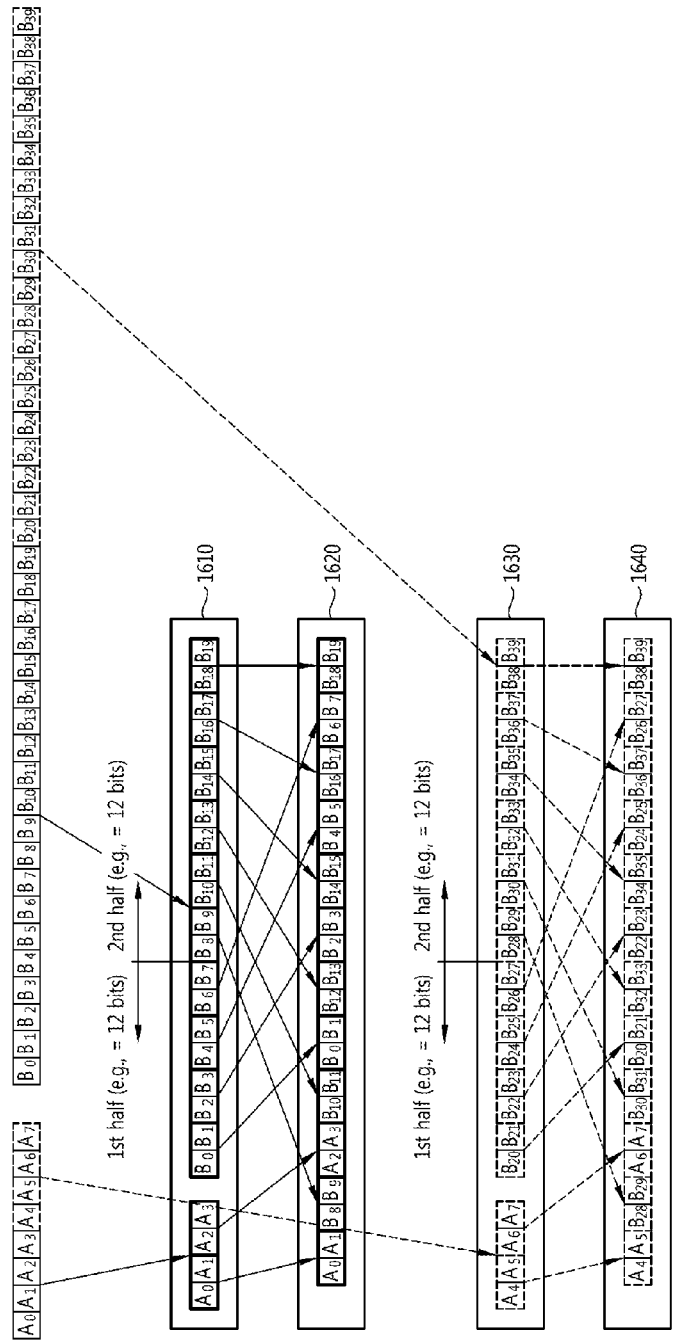
FIG. 16 shows a fourth interleaving technique.

FIG. 16 shows a fourth interleaving technique. The fourth interleaving technique is a method that combines the first interleaving technique and the second interleaving technique.

The example of FIG. 16, like the examples of FIGS. 14 and 15, is an example in which the output coded bits ($A_0$, $A_1$, ..., $A_{M-1}$) corresponding to the ACK/NACK bits and the output coded bit ($B_0$, $B_1$, ..., $B_{N-1}$) corresponding to the CSI bits are equally disposed at the 1st slot and the 2nd slot, respectively.

As illustrated in FIG. 16, the output of the first rate matching block 1230 is disposed equally at two sequences 1610 and 1630 configured by respective 24 bits. Further, the output of the second rate matching block 1260 is disposed equally at the remaining portion of the two sequences 1610 and 1630. That is, the output coded bits ($A_0$, $A_1$, ..., $A_{M-1}$) corresponding to the ACK/NACK bits are divided into two to be disposed equally at the first sequence 1610 and the second sequence 1630. Further, the output coded bit ($B_0$, $B_1$, ..., $B_{N-1}$) corresponding to the CSI bits are divided into two to be disposed equally at the first sequence 1610 and the second sequence 1630.

Thereafter, the interleaving is performed so that a front portion (e.g., the first 24 bits among the entire 24 bits) and a rear portion (the last 12 bits among the entire 24 bits) of each 24-bit sequence sequentially cross each other. That is, as illustrated in FIG. 16, the interleaving is performed by a method in which the first sequence 1610 is mapped to a third sequence 1620. Further, the interleaving is performed by a method in which the second sequence 1630 is mapped to a fourth sequence 1640.

A final result may be obtained by coupling the third sequence 1620 and the fourth sequence 1640. FIG. 17 shows a final result according to the fourth interleaving technique.

According to the examples of FIGS. 16 and 17, in the case of transmitting only the ACK/NACK bits, the interleaved bits may be generated in the same form as the existing case (in the case of transmitting only the ACK/NACK bits in the related art). Further, the CSI bits are transmitted together with the ACK/NACK bits, and like the aforementioned example, in the case of perform separate coding by using a separate RM coding block, there is an advantage in that the coded outputs corresponding to the ACK/NACK bits and the CSI bits are equally mapped and transmitted at the two slots of the PUCCH format 3.

The examples of FIGS. 16 and 17 will be described below on the basis of parameters and equations.

It is assumed that the RM encoder output for the A/N input is $A_0, A_1, \ldots, A_{M-1}$ and the RM encoder output for the CSI input is $B_0, B_1, \ldots, B_{N-1}$. In this case, it is assumed that M is a multiple of 2.

$$\{c_0, c_1, \ldots, c_{23}\} = \left\{ A_0, A_1, \ldots, A_{2\lceil \frac{M}{4} \rceil - 1}, B_0, B_1, \ldots, B_{2\lfloor \frac{N}{4} \rfloor - 1} \right\}$$

may be expressed. $\{c_0, c_1, \ldots, c_{23}\}$ corresponds to the first sequence 1610 of FIG. 16.

$$\{d_0, d_1, \ldots, d_{23}\} =$$
$$\left\{ A_{2\lceil \frac{M}{4} \rceil}, A_{2\lceil \frac{M}{4} \rceil + 1}, \ldots, A_{M-1}, B_{2\lfloor \frac{N}{4} \rfloor}, B_{2\lfloor \frac{N}{4} \rfloor + 1}, \ldots, B_{N-1} \right\}$$

may be expressed. $\{d_0, d_1, \ldots, d_{23}\}$ corresponds to the second sequence 1630 of FIG. 16.

In this case, a length of the bit string of $\{c_0, c_1, \ldots, c_{23}\}$ becomes $$2\left\lceil \frac{M}{4} \right\rceil + 2\left\lfloor \frac{N}{4} \right\rfloor.$$

The reason is that length of $A_0, A_1, \ldots, A_{M-1}$ is $$2\left\lceil \frac{M}{4} \right\rceil,$$

and a length of $B_0, B_1, \ldots,$ $$B_{N-1} \text{ is } 2\left\lfloor \frac{N}{4} \right\rfloor.$$

A length of $\{d_0, d_1, \ldots, d_{23}\}$ becomes $$2\left\lfloor \frac{M}{4} \right\rfloor + 2\left\lceil \frac{N}{4} \right\rceil.$$

The reason is that length of $A_0, A_1, \ldots, A_{M-1}$ is $$2\left\lfloor\frac{M}{4}\right\rfloor,$$

and a length of $B_0, B_1, \ldots, B_{N-1}$ is $$2\left\lceil\frac{N}{4}\right\rceil.$$

A method of generating the bit string after the interleaving illustrated in FIG. 17 may be expressed by pseudo code as follows.

```
Set k=0
while k< 24
    if k < 2⌈M/4⌉
        c_k= A_k, c_{k+1}=A_{k+1}
    else
        c_k=B_k, c_{k+1}=B_{k+1}
    end if if k < 2⌈M/4⌉
        d_k = A_{2⌈M/4⌉+k}, d_{k+1} = A_{2⌈M/4⌉+k+1}
    else
        d_k = B_{2⌊N/4⌋+k}, d_{k+1} = B_{2⌊N/4⌋+k+1}
    end if
    k=k+2
end while
Set i, j = 0
while i<12
    b_j = c_i, b_{j+1}=c_{i+1}, b_{j+2}=c_{12+i}, b_{j+3}=c_{12+i+1}
    b_{24+j} = d_i, b_{24+j+1}=d_{i+1}, b_{24+j+2}=d_{12+i}, b_{24+j+3}=d_{12+i+1}
    i=i+2
    j=j+4
end while
```

In this case, the bit string $b_0, b_1, \ldots, b_{47}$ becomes the input of the PUCCH when being transmitted to the PUCCH format 3.

Figure 18:
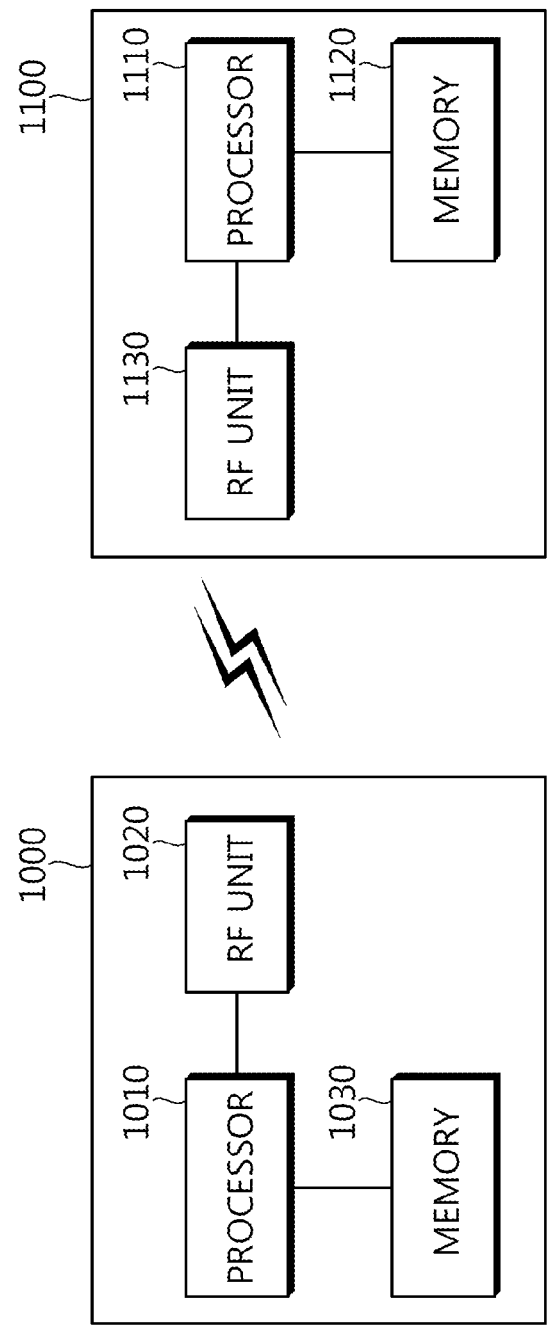
FIG. 18 shows a transmitting apparatus to which the method according to the specification is applied.

FIG. 18 illustrates a user equipment and a base station to which the aforementioned examples are applied.

The aforementioned technique may be implemented by a user equipment 1000 as an apparatus of transmitting control information through a uplink. The user equipment 1000 may communicate with a base station 1100.

The user equipment 1000 includes a processor 1010, a memory 1030, and a radio frequency (RF) unit 1020. The processor 1010 may allocate a radio resource according to information provided from the outside, information pre-stored therein, and the like. Among the aforementioned exemplary embodiments, a procedure, a technique, and a function performed by the user equipment may be implemented by the processor 1010. The memory 1030 is connected with the processor 1010 to store various information for driving the processor 1010. The RF unit 1020 is connected with the processor 1010 to transmit and/or receive the radio resource.

The base station 1100 communicating with the user equipment includes a processor 1110, a memory 1120, and a radio frequency (RF) unit 1130. Among the aforementioned exemplary embodiments, a procedure, a technique, and a function performed by the base station may be implemented by the processor 1110. The memory 1120 is connected with the processor 1110 to store various information for driving the processor 1110. The RF unit 1130 is connected with the processor 1110 to transmit and/or receive the radio resource.

The processors 1010 and 1110 may include an application-specific integrated circuit (ASIC), different chip sets, a logic circuit, and/or a data processing apparatus. The memories 1020 and 1120 may include a read-only memory (ROM), a random access memory (RAM), a flash memory, a memory card, a storage medium, and/or other storage devices. The RF units 1030 and 1130 may include a baseband circuit for processing a radio signal. When the exemplary embodiment is implemented by software, the aforementioned technique may be implemented by a module (a process, a function, and the like) performing the aforementioned function. The module may be stored in the memories 1020 and 1120 and executed by the processors 1010 and 1110. The memories 1020 and 1120 may be disposed inside or outside of the processors 1010 and 1110, and connected with the processors 1010 and 1110, as various widely known means.

The aforementioned method and apparatus may be implemented by software, hardware, or a combination thereof. The hardware may be implemented by an application specific integrated circuit (ASIC), a digital signal processing (DSP), a programmable logic device (PLD), a field programmable gate array (FPGA), a processor, a controller, a microprocessor, other electronic units, or a combination thereof. The software may be implemented by the module performing the aforementioned function. The software may be stored in a memory unit and executed by the processor. The memory unit or the processor may adopt various means which are known well to those skilled in the art.

What is claimed is:

1. A method of transmitting control information through an uplink in a wireless communication system which supports a plurality of carriers related to carrier aggregation, the method comprising:
    configuring bits to be transmitted through a physical uplink control channel (PUCCH)by acquiring at least one channel state information (CSI) bit representing a radio channel state and a plurality of ACK/NACK bits related to the plurality of carrier;
    encoding the plurality of ACK/NACK bits to a 32-bit sequence by using a first reed-muller coding block, and generating a first bit sequence by performing rate matching in which the 32-bit sequence encoded by the first reed-muller coding block is truncated or circular-repeated;
    encoding at least one CSI bit to the 32-bit sequence by using a second reed-muller coding block, and generating a second bit sequence by performing rate matching in which the 32-bit sequence encoded by the second reed-muller coding block is truncated or circular-repeated;
    interleaving the first bit sequence and the second bit sequence; and
    modulating the interleaved bit sequence,
    wherein an entire length of the first bit sequence and the second bit sequence is determined to be 48 bits, and an entire length of the interleaved bit sequence is determined to be 48 bits, wherein the first 24 bits of the interleaved bit sequence are transmitted through a first slot of a subframe, and the last 24 bits of the interleaved bit sequence are transmitted through a second slot of the subframe, wherein the interleaved bit sequence is modulated to a plurality of Quadrature Phase Shift Keying (QPSK) symbols, and wherein the encoding by first reed-muller coding block uses the same base sequence as the encoding by the second reed-muller coding block.

2. The method of claim 1, wherein when bits included in the first bit sequence are expressed in the order of $A_0, A_1, \ldots, A_{M-1}$ and bits included in the second bit sequence are expressed in the order of $B_0, B_1, \ldots, B_{N-1}$, M represents a length of the first bit sequence, N represents a length of the second bit sequence, and M is smaller than N, and the bits included in the interleaved bit sequence are expressed in the order of $A_0, A_1, B_0, B_1, \ldots, A_{M-2}, A_{M-1}, B_{M-2}, B_{M-1}, B_M, B_{M+1}, \ldots, B_{N-2} B_{N-1}$.

3. The method of claim 1, wherein when bits included in the first bit sequence are expressed in the order of $A_0, A_1, \ldots, A_{M-1}$ and bits included in the second bit sequence are expressed in the order of $B_0, B_1, \ldots, B_{N-1}$, M represents a length of the first bit sequence, N represents a length of the second bit sequence, M is a multiple of 4, and M is smaller than N, and the bits included in the interleaved bit sequence are expressed in the order of $A_0, A_1, A_4, A_5, \ldots, A_{M-4}, A_{M-3}, B_0, B_1, B_4, B_5, \ldots, B_{N-4}, B_{N-3}, A_2, A_3, A_6, A_7, \ldots, A_{M-2}, A_{M-1}, B_2, B_3, B_6, B_7, \ldots, B_{N-2}, B_{N-1}$.

4. The method of claim 1, wherein the modulated symbols are transmitted by using a PUCCH format 3.

5. The method of claim 1, wherein when bits included in the first bit sequence are expressed in the order of $A_0, A_1, \ldots, A_{M-1}$ and bits included in the second bit sequence are expressed in the order of $B_0, B_1, \ldots, B_{N-1}$, M represents a length of the first bit sequence, N represents a length of the second bit sequence, M is not a multiple of 4 but a multiple of 2, and M is smaller than N, and the bits included in the interleaved bit sequence are expressed in the order of $A_0, A_1, A_4, A_5, \ldots, A_{M-4}, A_{M-3}, B_0, B_1 B_4, B_5, \ldots, B_{N-4}, B_{N-3}, A_2, A_3, A_6, A_7, \ldots, A_{M-2}, A_{M-1}, B_2, B_3, B_6, B_7, \ldots, B_{N-2}, B_{N-1}$.

6. The method of claim 1, wherein when bits included in the first bit sequence are expressed in the order of $A_0, A_1, \ldots, A_{M-1}$ and bits included in the second bit sequence are expressed in the order of $B_0, B_1, \ldots, B_{N-1}$, M represents a length of the first bit sequence, N represents a length of the second bit sequence, M is a multiple of 4, and M is smaller than N, and the bits included in the interleaved bit sequence are expressed in the order of $A_0, A_1, B_0, B_1, A_4, A_5, B_4, B_5 \ldots, A_{M-4}, A_{M-3}, B_{N-4}, B_{N-3}, A_2, A_3, B_2, B_3, A_6, A_7, B_6, B_7, \ldots, A_{M-2}, A_{M-1}, B_{N-2}, B_{N-1}$.

7. The method of claim 1, wherein when bits included in the first bit sequence are expressed in the order of $A_0, A_1, \ldots, A_{M-1}$ and bits included in the second bit sequence are expressed in the order of $B_0, B_1, \ldots, B_{N-1}$, M represents a length of the first bit sequence, N represents a length of the second bit sequence, M is not a multiple of 4 but a multiple of 2, and M is smaller than N, and the bits included in the interleaved bit sequence are expressed in the order of $A_0, A_1, B_0, B_1, A_4, A_5, B_4, B_5, \ldots, A_{M-2} A_{M-1} B_{M-2}, B_{M-1}, A_2, A_3, B_2, B_3, A_6, A_7, \ldots, A_{M-4}, A_{M-3}, \ldots, B_{M-4}, B_{M-3}, B_{N-4}, B_{N-3}$.

* * * * *